(12) United States Patent
Ueda et al.

(10) Patent No.: US 6,339,786 B1
(45) Date of Patent: Jan. 15, 2002

(54) TERMINAL DEVICE

(75) Inventors: Eiji Ueda; Toshitaka Hanaura; Shinji Kawano; Futoshi Nakabe, all of Hiroshima (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/260,055

(22) Filed: Mar. 2, 1999

(30) Foreign Application Priority Data

Mar. 3, 1998  (JP) ........................................... 10-051155

(51) Int. Cl.[7] ............................................. G06F 15/16
(52) U.S. Cl. ..................... 709/217; 709/219; 709/238; 709/242; 709/213; 709/250; 707/202; 707/203; 707/204; 707/205; 707/526; 707/1; 707/2; 711/161
(58) Field of Search ................................. 709/213, 217, 709/219, 250, 238, 242; 707/1, 2, 202–205, 526; 711/161

(56) References Cited

U.S. PATENT DOCUMENTS

| 5,522,067 | A | * | 5/1996 | Swire ........................ 707/204 |
| 5,651,132 | A | * | 7/1997 | Honda et al. ............... 711/114 |
| 5,724,552 | A | * | 3/1998 | Taoda ......................... 711/165 |
| 5,819,032 | A | * | 10/1998 | Vries et al. ................. 709/250 |
| 5,855,020 | A | * | 12/1998 | Kirsch ......................... 707/10 |
| 5,857,187 | A | * | 1/1999 | Uenoyama et al. ............ 707/8 |
| 5,870,605 | A | * | 2/1999 | Bracho et al. .............. 709/302 |
| 5,893,139 | A | * | 4/1999 | Kamiyama .................. 711/117 |
| 6,021,433 | A | * | 2/2000 | Payne et al. ................ 709/219 |
| 6,148,330 | A | * | 11/2000 | Puri et al. ................... 709/217 |

* cited by examiner

Primary Examiner—Meng-Al T. An
Assistant Examiner—Nabil El-Hady
(74) Attorney, Agent, or Firm—Wenderoth, Lind & Ponack, L.L.P.

(57) ABSTRACT

A data broadcasting station transmits a multiplexed signal in which multimedia data encoded in a prescribed coding system are at least multiplexed in a broadcasting form. A file manager stores the multimedia data received by a tuner and decoded by a decoder in a storage device while creating management information therefor and registering it in a table. A browser requests of the file manager multimedia data to be referred to, and lets it be displayed on a monitor. The file manager increments/decrements a retention coefficient on the basis of a frequency of reference to the multimedia, and determines whether or not to delete each multimedia data stored in the storage device. Thus provided is a terminal device which can effectively utilize the capacity of the storage device without deleting multimedia data frequently referred to by the user.

13 Claims, 21 Drawing Sheets

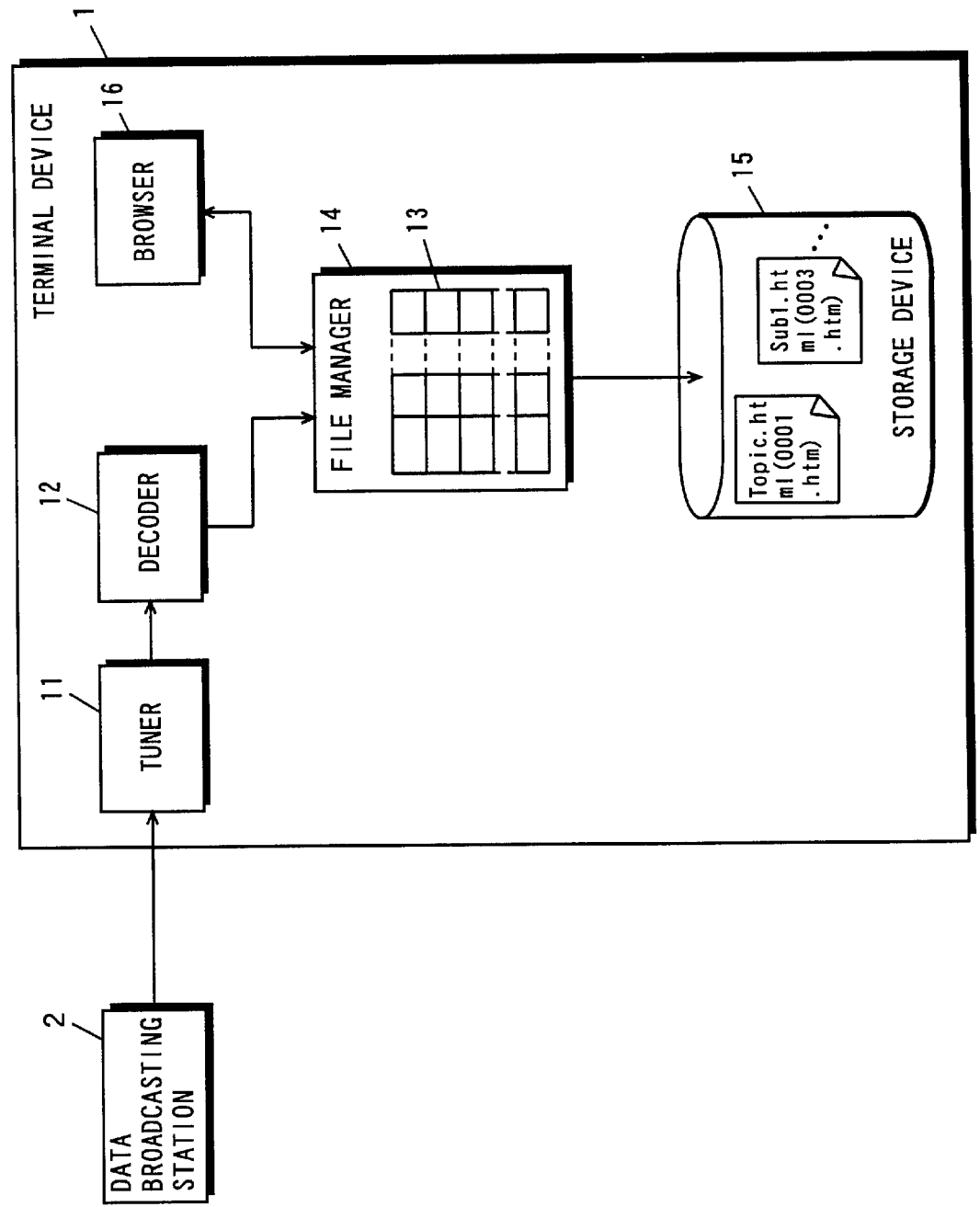

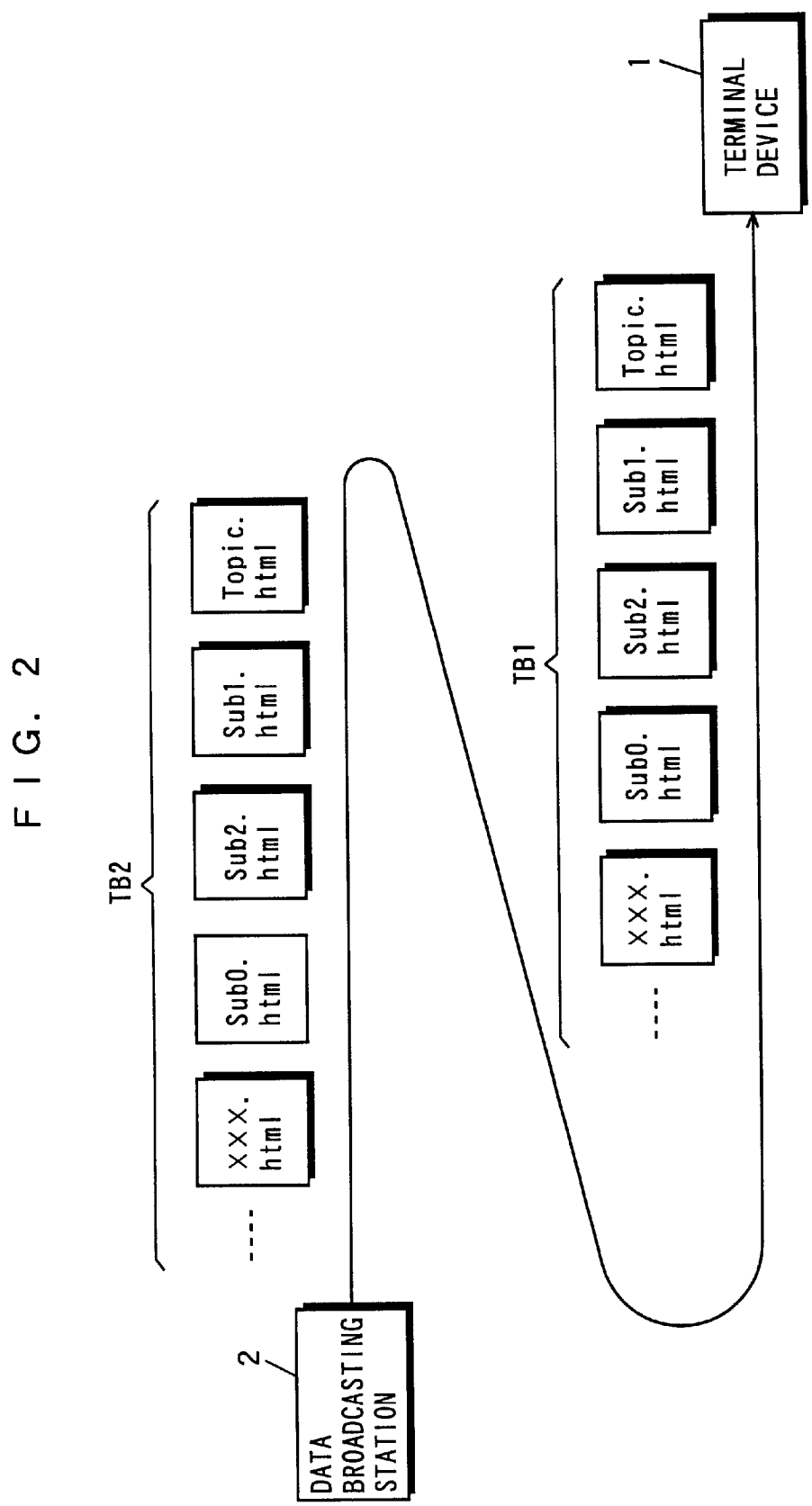

FIG. 3 (a)

| | | |
|---|---|---|
| REFERENCE LABEL | ... | ○×○.html |
| STORAGE TIME | ... | 00:00 |
| FILE NAME | ... | ○○○.htm |
| REFERENCE FLAG | ... | N1 |
| UNREFERRED TIME | ... | N2 |
| RETENTION COEFFICIENT | ... | N3 |

FIG. 3 (b)

| | | | 131 |
|---|---|---|---|
| REFERENCE LABEL | ... | ○×○.html | |
| STORAGE TIME | ... | 00:00 | |
| FILE NAME | ... | ○○○.htm | |
| REFERENCE FLAG | ... | N1 | |
| UNREFERRED TIME | ... | N2 | |
| RETENTION COEFFICIENT | ... | N3 | |

FIG. 3 (c)

| | | | 131 |
|---|---|---|---|
| REFERENCE LABEL | ... | ○×○.html | Topic.html |
| STORAGE TIME | ... | 00:00 | 08:58 |
| FILE NAME | ... | ○○○.htm | 0001.htm |
| REFERENCE FLAG | ... | N1 | 「0」 |
| UNREFERRED TIME | ... | N2 | 「0」 |
| RETENTION COEFFICIENT | ... | N3 | 「1」 |

| | | | | | |
|---|---|---|---|---|---|
| REFERENCE LABEL | ... | ○×○.html | Topic.html | Sub1.html | Sub2.html |
| STORAGE TIME | ... | 00:00 | 08:58 | 08:59 | 09:02 |
| FILE NAME | ... | ○○○.htm | 0001.htm | 0003.htm | 0007.htm |
| REFERENCE FLAG | ... | N1 | 「0」 | 「0」 | 「0」 |
| UNREFERRED TIME | ... | N2 | 「8」 | 「7」 | 「4」 |
| RETENTION COEFFICIENT | ... | N3 | 「1」 | 「1」 | 「1」 |

FIG. 10 (a)

IMMEDIATELY AFTER 9:06 A.M. — 13

| REFERENCE LABEL | ... | Topic.html | Sub1.html | Sub2.html | Sub0.html |
|---|---|---|---|---|---|
| STORAGE TIME | ... | 08:58 | 08:59 | 09:02 | — |
| FILE NAME | ... | 0001.htm | 0003.htm | 0007.htm | — |
| REFERENCE FLAG | ... | 1 | 2 | 3 | 2 |
| UNREFERRED TIME | ... | 0 | 0 | 0 | 0 |
| RETENTION COEFFICIENT | ... | 2 | 1.5 | 1.25 | 1.5 |

FIG. 10 (b)

IMMEDIATELY AFTER 9:07 A.M. — 13

| REFERENCE LABEL | ... | Topic.html | Sub1.html | Sub2.html | Sub0.html |
|---|---|---|---|---|---|
| STORAGE TIME | ... | 08:58 | 08:59 | 09:02 | 09:07 |
| FILE NAME | ... | 0001.htm | 0003.htm | 0007.htm | 0008.htm |
| REFERENCE FLAG | ... | 1 | 2 | 3 | 2 |
| UNREFERRED TIME | ... | 0 | 0 | 0 | 0 |
| RETENTION COEFFICIENT | ... | 2 | 1.5 | 1.25 | 1.5 |

FIG. 10 (c)

IMMEDIATELY AFTER 9:08 A.M. — 13

| REFERENCE LABEL | ... | Topic.html | Sub1.html | Sub2.html | Sub0.html | ×××.html |
|---|---|---|---|---|---|---|
| STORAGE TIME | ... | 08:58 | 08:59 | 09:02 | 09:07 | 09:08 |
| FILE NAME | ... | 0001.htm | 0003.htm | 0007.htm | 0008.htm | 0009.htm |
| REFERENCE FLAG | ... | 1 | 2 | 3 | 2 | 0 |
| UNREFERRED TIME | ... | 0 | 0 | 0 | 0 | 0 |
| RETENTION COEFFICIENT | ... | 2 | 1.5 | 1.25 | 1.5 | 1 |

F I G. 1 4 (a)

IMMEDIATELY AFTER 9:10 A.M. /13

| REFERENCE LABEL | ... | Topic.html | Sub1.html | Sub2.html | Sub0.html | ×××.html |
|---|---|---|---|---|---|---|
| STORAGE TIME | ... | 08:58 | 08:59 | 09:02 | 09:07 | 09:08 |
| FILE NAME | ... | 0001.htm | 0003.htm | 0007.htm | 0008.htm | 0009.htm |
| REFERENCE FLAG | ... | 0 | 0 | 0 | 0 | 0 |
| UNREFERRED TIME | ... | 0 | 0 | 0 | 0 | 1 |
| RETENTION COEFFICIENT | ... | 2 | 1.5 | 1.25 | 1.5 | 1 |

F I G. 1 4 (b)

IATELY AFTERMMEDI 9:17 A.M. /13

| REFERENCE LABEL | ... | Topic.html | Sub1.html | Sub2.html | Sub0.html | ×××.html |
|---|---|---|---|---|---|---|
| STORAGE TIME | ... | 08:58 | 08:59 | 09:02 | 09:07 | 09:08 |
| FILE NAME | ... | 0001.htm | 0003.htm | 0007.htm | 0008.htm | 0009.htm |
| REFERENCE FLAG | ... | 0 | 0 | 0 | 0 | 0 |
| UNREFERRED TIME | ... | 8 | 8 | 8 | 8 | 9 |
| RETENTION COEFFICIENT | ... | 2 | 1.5 | 1.25 | 1.5 | 1 |

F I G. 1 4 (c)

IMMEDIATELY AFTER 9:18 A.M. /13

| REFERENCE LABEL | ... | Topic.html | Sub1.html | Sub2.html | Sub0.html |
|---|---|---|---|---|---|
| STORAGE TIME | ... | 08:58 | 08:59 | 09:02 | 09:07 |
| FILE NAME | ... | 0001.htm | 0003.htm | 0007.htm | 0008.htm |
| REFERENCE FLAG | ... | 0 | 0 | 0 | 0 |
| UNREFERRED TIME | ... | 9 | 9 | 9 | 9 |
| RETENTION COEFFICIENT | ... | 2 | 1.5 | 1.25 | 1.5 |

IMMEDIATELY AFTER 9:19 A.M.

| REFERENCE LABEL | ... | Topic.html | Sub1.html | Sub2.html | Sub0.html | Topic.html |
|---|---|---|---|---|---|---|
| STORAGE TIME | ... | 08:58 | 08:59 | 09:02 | 09:07 | 09:19 |
| FILE NAME | ... | 0001.htm | 0003.htm | 0007.htm | 0008.htm | 0002.htm |
| REFERENCE FLAG | ... | 0 | 0 | 0 | 0 | 0 |
| UNREFERRED TIME | ... | 9 | 9 | 9 | 9 | 9 |
| RETENTION COEFFICIENT | ... | 2 | 1.5 | 1.25 | 1.5 | 2 |

F I G. 1 6 (a)

| REFERENCE LABEL | ⋯ | Topic.html | Sub1.html | Sub2.html | Sub0.html |
|---|---|---|---|---|---|
| STORAGE TIME | ⋯ | 08:58 | 08:59 | 09:02 | 09:07 |
| FILE NAME | ⋯ | 0001.htm | 0003.htm | 0007.htm | 0008.htm |
| REFERENCE FLAG | ⋯ | 1 | 2 | 3 | 2 |
| UNREFERRED TIME | ⋯ | 0 | 0 | 0 | 0 |
| RETENTION COEFFICIENT | ⋯ | 2 | 1.5 | 1.25 | 1.5 |

F I G. 1 6 (b)

| REFERENCE LABEL | ⋯ | Topic.html | Sub1.html | Sub2.html | Sub0.html | Topic.html |
|---|---|---|---|---|---|---|
| STORAGE TIME | ⋯ | 08:58 | 08:59 | 09:02 | 09:07 | 09:19 |
| FILE NAME | ⋯ | 0001.htm | 0003.htm | 0007.htm | 0008.htm | 0002.htm |
| REFERENCE FLAG | ⋯ | 1 | 2 | 3 | 2 | 0 |
| UNREFERRED TIME | ⋯ | 0 | 0 | 0 | 0 | 0 |
| RETENTION COEFFICIENT | ⋯ | 2 | 1.5 | 1.25 | 1.5 | 1 |

F I G. 1 6 (c)

| REFERENCE LABEL | ⋯ | Topic.html | Sub1.html | Sub2.html | Sub0.html | Topic.html |
|---|---|---|---|---|---|---|
| STORAGE TIME | ⋯ | 08:58 | 08:59 | 09:02 | 09:07 | 09:19 |
| FILE NAME | ⋯ | 0001.htm | 0003.htm | 0007.htm | 0008.htm | 0002.htm |
| REFERENCE FLAG | ⋯ | 1 | 0 | 0 | 0 | 0 |
| UNREFERRED TIME | ⋯ | 0 | 0 | 0 | 0 | 0 |
| RETENTION COEFFICIENT | ⋯ | 2 | 1.5 | 1.25 | 1.5 | 2 |

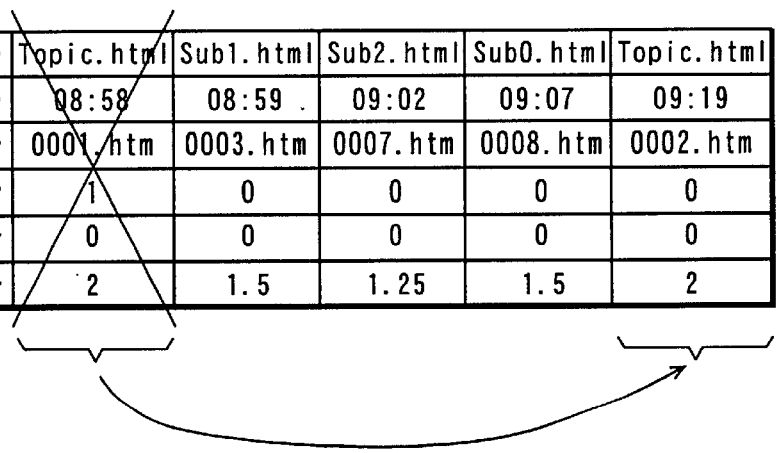

FIG. 18 (a)

| REFERENCE LABEL | ... | Topic.html | Sub1.html | Sub2.html | Sub0.html |
|---|---|---|---|---|---|
| STORAGE TIME | ... | 08:58 | 08:59 | 09:02 | 09:07 |
| FILE NAME | ... | 0001.htm | 0003.htm | 0007.htm | 0008.htm |
| REFERENCE FLAG | ... | 1 | 2 | 3 | 2 |
| UNREFERRED TIME | ... | 0 | 0 | 0 | 0 |
| RETENTION COEFFICIENT | ... | 2 | 1.5 | 1.25 | 1.5 |

FIG. 18 (b)

| REFERENCE LABEL | ... | Topic.html | Sub1.html | Sub2.html | Sub0.html | Topic.html |
|---|---|---|---|---|---|---|
| STORAGE TIME | ... | 08:58 | 08:59 | 09:02 | 09:07 | 09:19 |
| FILE NAME | ... | 0001.htm | 0003.htm | 0007.htm | 0008.htm | 0002.htm |
| REFERENCE FLAG | ... | 1 | 2 | 3 | 2 | 0 |
| UNREFERRED TIME | ... | 0 | 0 | 0 | 0 | 0 |
| RETENTION COEFFICIENT | ... | 2 | 1.5 | 1.25 | 1.5 | 1 |

FIG. 18 (c)

| REFERENCE LABEL | ... | Topic.html | Sub1.html | Sub2.html | Sub0.html | Topic.html |
|---|---|---|---|---|---|---|
| STORAGE TIME | ... | 08:58 | 08:59 | 09:02 | 09:07 | 09:19 |
| FILE NAME | ... | 0001.htm | 0003.htm | 0007.htm | 0008.htm | 0002.htm |
| REFERENCE FLAG | ... | 1 | 2 | 3 | 2 | 0 |
| UNREFERRED TIME | ... | 0 | 0 | 0 | 0 | 0 |
| RETENTION COEFFICIENT | ... | 2 | 1.5 | 1.25 | 1.5 | 2 |

FIG. 18 (d)

| REFERENCE LABEL | ... | Topic.html | Sub1.html | Sub2.html | Sub0.html | Topic.html |
|---|---|---|---|---|---|---|
| STORAGE TIME | ... | 08:58 | 08:59 | 09:02 | 09:07 | 09:19 |
| FILE NAME | ... | 0001.htm | 0003.htm | 0007.htm | 0008.htm | 0002.htm |
| REFERENCE FLAG | ... | 1 | 2 | 3 | 2 | 1 |
| UNREFERRED TIME | ... | 0 | 0 | 0 | 0 | 0 |
| RETENTION COEFFICIENT | ... | 2 | 1.5 | 1.25 | 1.5 | 2 |

TERMINAL DEVICE

BACKGROUND OF THE INVENTION

1. Field of the Invention

The present invention relates to a terminal device, and more specifically, it relates to a terminal device performing prescribed processing on multimedia data transmitted by a remotely set data broadcasting station.

2. Description of the Background Art

Conventionally, a terminal device receiving and displaying multimedia data has been developed. The terminal device gets the multimedia data in the following manner: Multimedia data is previously stored in a WWW (World Wide Web) server. The terminal device accesses this WWW server through the Internet on the basis of a user's instruction, for retrieving necessary multimedia data. Conventionally, a method of getting multimedia data has been mainly the so-called pull type, such a method that the user pulls out the data.

Against the pull type, recently a demand for a method of pushing out data toward the user (the so-called push type), i.e., multimedia data broadcasting is increasing. For example, DAB (Digital Audio Broadcasting) of EUREKA-147 project in Europe exactly corresponds to this push type. In this multimedia data distribution, the user indicates to the terminal device the channel transmitting necessary data. The terminal device automatically receives and displays the data through the channel. Thus, the user of the terminal device can readily get multimedia data with operation feeling similar to that for the conventional television or radio. This multimedia data distribution has such an advantage that processing of retrieving necessary data may not be performed.

In this multimedia data distribution, the broadcasting station cannot receive a request from the user's terminal device in real-time. Consequently, it is difficult to control the contents of broadcast multimedia data on the user side. For example, even if the user desires to get already distributed multimedia data, he cannot transmit the request therefor to the broadcasting station, and hence it is difficult to get the multimedia data. As a method of solving such a problem and providing the user with a degree of flexibility for reference to the multimedia data, it is conceivable to set in the terminal device a storage device (typically a hard disk drive) for storing and managing multimedia data. Thus, when continuously storing multimedia data distributed from the broadcasting station in the storage device, the terminal device can get, for example, already broadcasted multimedia data from this storage device. Thus, the degree of flexibility for the user in reference to the multimedia data is improved.

Multimedia data has a large size. In order to continuously store the multimedia data, the terminal device must comprise a storage device having a sufficiently large capacity. However, it is difficult for the terminal device to comprise a mass storage device due to restriction of its space and cost. Therefore, the terminal device must effectively utilize a storage device having a limited capacity. As one method of such effective utilization, there is such a method that the storage device stores and deletes received multimedia data in a time-series manner so that the terminal device can regularly get newest multimedia data, for example. In this method, however, there has been such a problem that multimedia data frequently referred to by the user is also deleted in a time-series manner.

SUMMARY OF THE INVENTION

Therefore, an object of the present invention is to provide a terminal device which can effectively utilize the capacity of a storage device without deleting multimedia data frequently referred to by the user.

The present invention has the following aspects to achieve the object above.

A first aspect of the present invention is directed to a terminal device performing prescribed processing on multimedia data distributed by a data broadcasting station distributing multimedia data identical with each other at time intervals in a broadcasting form, comprising:

a receiving part receiving the multimedia data distributed by the data broadcasting station, a management part creating and managing management information as to the multimedia data received by the receiving part, a storage device storing the multimedia data for which the management information has been created by the management part, and a reference part requesting multimedia data to the management part while letting the user refer to the requested multimedia data, wherein the management part creates as part of the management information a retention coefficient indicating whether or not to delete each multimedia data in the storage device, decrements each created retention coefficient at a prescribed timing while incrementing the retention coefficient of the multimedia data requested by the reference part, deletes, when the created retention coefficient is decremented to a prescribed value, the corresponding multimedia data from the storage device, and deletes, when new multimedia data identical to old multimedia data in the storage device is inputted, the old multimedia data from the storage while letting the management information for the old multimedia data inherited as management information for the new multimedia data.

As described above, in the first aspect, the management part increments/decrements the retention coefficient on the basis of the frequency of reference by the user to the multimedia data. Namely, if the multimedia data is not at all referred to, its retention coefficient is immediately decremented to the prescribed value. If the multimedia data is frequently referred to, on the other hand, the retention coefficient is incremented. When the retention coefficient reaches the prescribed value, the management part deletes the corresponding multimedia data from the storage device. Therefore, multimedia data having a small frequency of reference is preferentially deleted from the storage device, while multimedia data having a large frequency of reference is contrarily retained in the storage device over a long period. According to the first aspect, as described above, the multimedia data in the storage device can be customized in a state preferable for the user. Further, multimedia data having a small frequency of reference is immediately deleted, whereby the capacity required by the storage device can be suppressed.

In the first aspect, further, multimedia data identical with each other is distributed to the terminal device. The management part lets the management information for the old multimedia data inherited as the management information for the new multimedia data. If this old multimedia data is frequently referred to by the user, its retention coefficient has a large value. Therefore, the new multimedia data, the retention coefficient of which is set from the beginning at a large value, is hard to delete from the storage device. Namely, multimedia data highly interesting to the user and being new are regularly stored in the storage device. Thus, it follows that the multimedia data in the storage device are customized for the user in a further preferable state.

According to a second aspect, in the first aspect, the management part further
- creates, when the multimedia data requested by the reference part is not stored in the storage device, temporary-management-information as to the multimedia data in advance, and
- lets, at a time point when the multimedia data requested by the reference part is inputted in the management part, the corresponding temporary-management-information inherited as management information for the inputted multimedia data.

The reference part may request multimedia data not yet stored in the storage device to the management part. Such multimedia data requested but not yet stored is in the future transmitted and stored in the storage device. As described above, in the second aspect, the management part creates, even if the requested multimedia data is not yet stored in the storage device, temporary-management-information for the multimedia data. The management part creates, at the time point when such multimedia data is stored in the storage device, management information inheriting the temporary-management-information. Namely, the management part can create a retention coefficient having a large value from the beginning. Therefore, such multimedia data is hard to delete from the storage device. Thus, it follows that the multimedia data in the storage device are customized for the user in a further preferable state.

According to a third aspect, in the second aspect, the management part further
- searches multimedia data (hereinafter referred to as related-multimedia-data) being related to the multimedia data requested by the reference part, and
- increments the retention coefficient of the found related-multimedia-data.

As described above, in the third aspect, the data broadcasting station transmits to the terminal device multimedia data being related to each other. The management part increments not only the retention coefficient of the multimedia data requested by the reference part but also the retention coefficient of the multimedia data being related thereto. Therefore, it follows that the related-multimedia-data also remains in the storage device for a long time. Thus, it follows that the multimedia data in the storage device are customized for the user in a further preferable state.

According to a fourth aspect, in the third aspect, the management part further searches the related-multimedia-data in a search range specified by the reference part.

As described above, in the fourth aspect, the management part gets the related-multimedia-data belonging to a specific range. Namely, it is possible to reliably select only multimedia data being related to the requested multimedia data. Thus, it follows that the multimedia data in the storage device are customized for the user in a further preferable state.

According to a fifth aspect, in the third aspect, the management part further increments the retention coefficient of the related-multimedia-data on the basis of the degree of the relation to the multimedia data requested by the reference part.

Each found related-multimedia-data does not necessarily have a given degree of relation to the reference part. If uniformly incrementing retention coefficients of related-multimedia-data, therefore, related-multimedia-data less related to the requested multimedia data remains stored in the storage device for a long time. As described above, in the fifth aspect, the retention coefficient of the related-multimedia-data is incremented on the basis of the degree of relation to multimedia data requested by the reference part. With reference to the requested multimedia data, therefore, closely-related multimedia data tends to remain in the storage device for a long time. Thus, it follows that the multimedia data in the storage device are customized for the user in a further preferable state.

According to a sixth aspect, in the third aspect, the management part further
- creates, when the found related-multimedia-data is not stored in the storage device, temporary-management-information as to the related-multimedia-data in advance, and
- lets, at a time point when related-multimedia-data not yet stored in the storage device is inputted in the management part, the corresponding temporary-management-information inherited as management information for the inputted related-multimedia-data.

The management part may select multimedia data not yet stored in the storage device as related-multimedia-data. Such non-stored/relevant multimedia data is in the future transmitted and stored in the storage device. As described above, in the sixth aspect, the management part creates, even if selected related-multimedia-data is not yet stored in the storage device, temporary-management-information for this multimedia data. The management part creates, in storage of the related-multimedia-data, management information inheriting the temporary management information. Namely, the management part can create a retention coefficient having a large value from the beginning. Therefore, this related-multimedia-data is hard to delete from the storage device. Thus, it follows that the multimedia data in the storage device is customized for the user in a further preferable state.

According to a seventh aspect, in the third aspect, the management part further outputs, when new multimedia data identical to multimedia data or related-multimedia-data thereof being referred by the user with the reference part is inputted in the management part, the inputted new multimedia data to the reference part.

As described above, in the seventh aspect, the management part immediately outputs the aforementioned new identical multimedia data to the reference part when it is inputted. Therefore, the reference part can get, with no requirement to the management part, multimedia data very interesting to the user and being new in real-time from the management part, and let the user refer to the multimedia data. Thus, the terminal device becomes more user-friendly.

According to an eighth aspect, in the seventh aspect, the management part further re-outputs, after a given time passes since the new multimedia data is outputted to the reference part, the multimedia data referred to immediately before the new multimedia data.

As described above, in the eighth aspect, the management part re-outputs, after a given time passes since the new multimedia data is outputted to the reference part, the multimedia data referred to by the user immediately before the new multimedia data. In this way, the multimedia data which has been referred to immediately before the input of the new multimedia data is referred again by the user. The series of processing is automatically performed by the management part, and hence requires no specific operation to the user. Thus, the terminal device becomes more user-friendly.

According to a ninth aspect, in the seventh aspect, the management part further does not output, on the basis of an instruction from the reference part, the multimedia data newly inputted in the management part to the reference part.

The reference part in the seventh aspect lets the user refer to the multimedia data sequentially and continuously outputted from the management part. Namely, the multimedia data to be referred to by the user is switched every time multimedia data is inputted to the reference part. According to the ninth aspect, the management part stops, on the basis of the instruction from the reference part, the output of the newly inputted multimedia data. Thus, the reference part can require the management part to stop outputting the multimedia data as required. Thus, the reference part can let the user refer to specific multimedia data, among multimedia data sequentially and continuously inputted, for a long time. Thus, the terminal device becomes further more user-friendly.

According to a tenth aspect, in the first aspect, multimedia data distributed by the data broadcasting station is coded in a predetermined coding format, the terminal device further comprises a decoding part for decoding the multimedia data received by the receiving part in accordance with the predetermined coding format and outputting the multimedia data to the management part, and the decoding part and the reference part operate independently of each other.

As described above, in the tenth aspect, the decoding part and the reference part operate independently of each other, whereby the reference part, i.e., the user may not specially operate to store multimedia data in the storage device. The decoding part continuously decodes the distributed multimedia data, whereby the multimedia data can be automatically stored in the storage device.

According to an eleventh aspect, in the first aspect, every time storing multimedia data in the storage device, the management part notifies the reference part of the fact.

As described above, in the eleventh aspect, the reference part is notified that multimedia data is stored in the storage device, whereby the user can understand in real-time that the multimedia data is stored in the storage device.

According to a twelfth aspect, in the first aspect, the management part does not delete, while multimedia data stored in the storage device is outputted by the reference part, the multimedia data from the storage device.

As described above, in the twelfth aspect, the multimedia data is not deleted by the management part from the storage device while it is referred to by the user. Thus, the multimedia data referred to by the user with the reference part is not switched at random.

A thirteenth aspect is directed to a terminal device performing prescribed processing on multimedia data distributed by a data broadcasting station distributing multimedia data identical with each other at time intervals in a broadcasting form, comprising:

a receiving part receiving the multimedia data distributed by the data broadcasting station;

a management part creating and managing management information as to the multimedia data received by the receiving part;

a storage device storing the multimedia data for which the management information has been created by the management part; and a reference part requesting multimedia data to the management part while letting the user refer to the requested multimedia data, wherein the management part creates as part of the management information a retention coefficient indicating whether or not to delete each multimedia data in the storage device, updates, on the basis of the request for multimedia data by the reference part, a retention coefficient corresponding to the multimedia data, deletes, when the updated retention coefficient satisfies a prescribed condition, the corresponding multimedia data from the storage device, and creates, when new multimedia data not identical to multimedia data stored in the storage device is inputted, new management information as to the new multimedia data.

In the thirteenth aspect, the management part updates a retention coefficient on the basis of the frequency of reference to the multimedia data by the user. When the updated retention coefficient satisfies a prescribed condition, the management part deletes the corresponding multimedia data from the storage device while regarding the multimedia data as not being referred to by the user. Consequently, the multimedia data having a small frequency of reference is deleted from the storage device with the highest priority, whereas the multimedia data having a large frequency of reference is retained in the storage device over a long period. As described above, according to the thirteenth aspect, the multimedia data in the storage device can be customized in a state preferable for the user. Moreover, multimedia data having a small frequency of reference is immediately deleted, thereby suppressing the capacity of the storage device. Furthermore, in the thirteenth aspect, multimedia data identical with each other is distributed to the terminal device. The management part creates management information for completely new multimedia data which is not stored in the storage device. In other words, the management part does not create management information as to new multimedia data which is identical with old multimedia data stored in the storage device. That is, the new multimedia data can be managed by management information for the old multimedia data. In this way, inheritance of management information can be realized as in the case with first aspect. Thus, in the terminal device in the present invention, multimedia data very interesting to the user (that is, having a large frequency of reference by the user) and being new is stored in the storage device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a terminal device 1 according to a first or second embodiment of the present invention;

FIG. 2 is a diagram showing exemplary multimedia data distributed by a data broadcasting station 2 of FIG. 1;

FIGS. 3(*a*) to 3(*d*) show diagrams for illustrating management information created and managed by a file manager 14 of FIG. 1;

FIGS. 10(a) to 10(c) show diagrams for illustrating time transition of management information managed by the file manager 14 of FIG. 1;

FIGS. 14(a) to 14(c) show diagrams for illustrating time transition of management information managed by the file manager 14 of FIG. 1;

FIGS. 16(a) to 16(c) show diagrams for illustrating time transition of management information managed by the file manager 14 of FIG. 1;

FIGS. 18(a) to 18(d) show diagrams for illustrating time transition of management information managed by the file manager 14 of FIG. 1;

DESCRIPTION OF THE PREFERRED EMBODIMENTS

Figure 4:
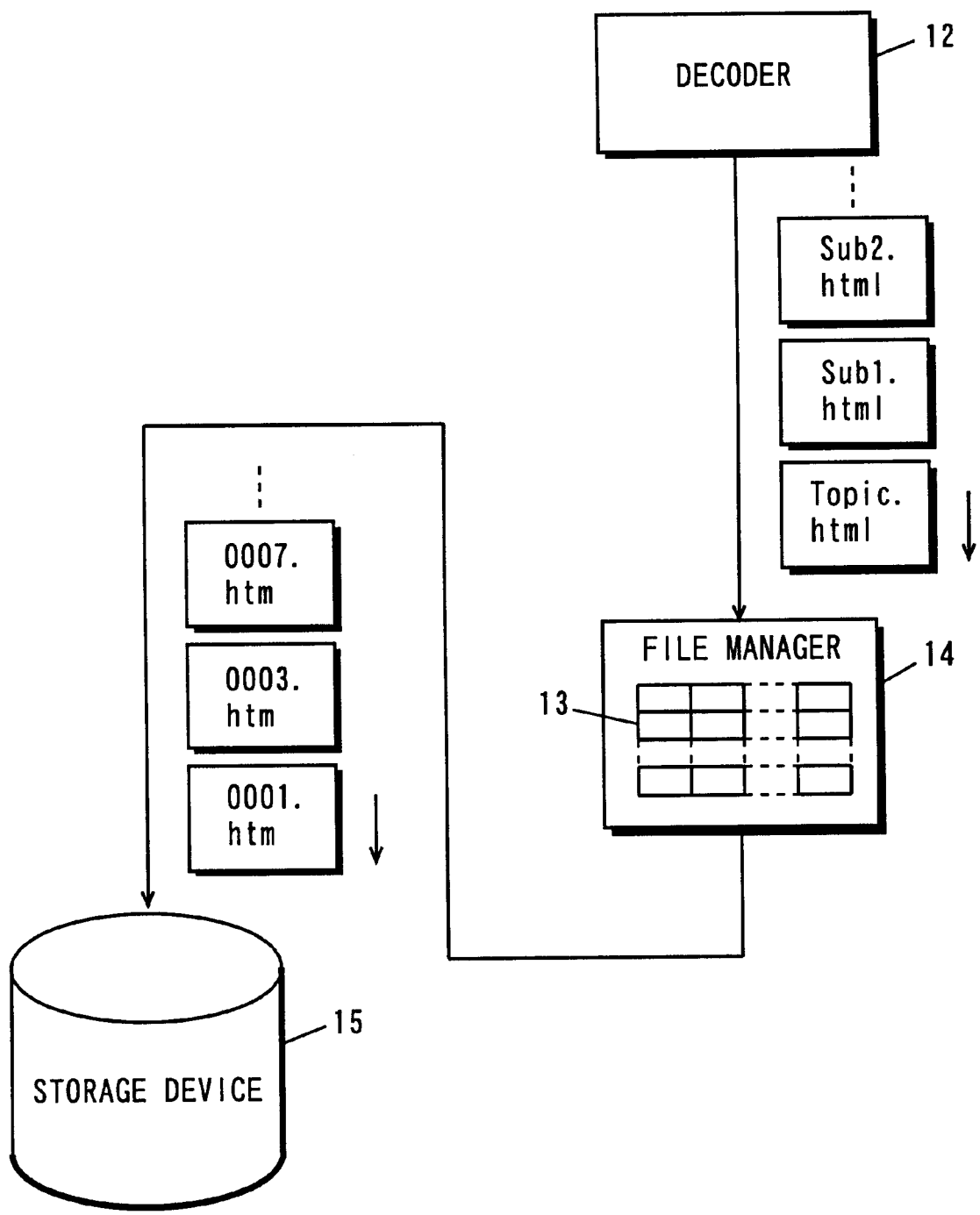
FIG. 4 is a diagram for illustrating the outline of processing of a decoder 12 and the file manager 14 shown in FIG. 1.

FIG. 1 is a block diagram showing the structure of a terminal device 1 according to an embodiment of the present invention. Referring to FIG. 1, a data broadcasting station 2 is remotely set from the terminal device 1. The data broadcasting station 2 transmits a signal (hereinafter referred to as multiplexed signal) in which multimedia data is at least multiplexed in a broadcasting form. The multimedia data is defined as a combination of two or more data among text data, still picture data, motion picture data and audio data. The multimedia data is typically created in the Hyper Text Markup Language (hereinafter abbreviated as HTML). To each multimedia data, a data name is assigned at the point of creation. The data name of HTML typically includes a specific extension html. Further, the multimedia data is encoded in a prescribed coding format. The multimedia data may be described only in the data name. For example, multimedia data having a data name Topic.html may simply be described as Topic.html.

As shown in FIG. 2, the data broadcasting station 2 distributes in a certain time zone TB1 Topic.html, Sub1.html, Sub2.html, Sub0.html, xxx.html, . . . in sequence. In a time zone TB2 after the time zone TB1, further, Topic.html, Sub1.html, Sub2.html, Sub0.html, xxx.html, . . . are distributed in sequence. Namely, multimedia data having the same data names is distributed at time intervals. However, texts, pictures and the like included in the multimedia data of the same names, being related to each other, are updated as the time passes. For example, a picture showing a weather chart or a text showing a weather forecast is updated after a lapse of time. However, this picture or text shows the weather chart or weather forecast of a constant place. Thus, in this embodiment, multimedia data being identical with each other is distributed at time intervals. This term multimedia data mutually being identical with each other means those including mutually different texts, pictures and the like, which are so determined by the terminal device 1 that the properties and attributes thereof are identical to each other. While the details are described later, the terminal device 1 makes this determination of identity on the basis of the data names assigned to the multimedia data.

The terminal device 1 performs on the multimedia data the following processing: The terminal device 1 separates the multimedia data from the received multiplexed signal. Since the multimedia data have been encoded, the terminal device 1 decodes the separated multimedia data. The terminal device 1 stores the multimedia data while outputting each multimedia data as required. The text or the picture of the outputted multimedia data is referred to by the user of the terminal device 1. In order to perform the above processing, the terminal device 1 comprises a tuner 11, a decoder 12, a file manager 14 holding a table 13 therein, a storage device 15 and a browser 16, as shown in FIG. 1. The tuner 11, the decoder 12, the file manager 14, the storage device 15 and the browser 16 are typical examples of a receiving part, a decoding part, a management part, a storage and a reference part in claims.

The tuner 11 receives the multiplexed signal transmitted by the data broadcasting station 2 and incorporates it in the terminal device 1. The tuner 11 further separates the encoded multimedia data from the received multiplexed signal and outputs the separated multimedia data to the decoder 12. The decoder 12 decodes the inputted multimedia data in accordance with a prescribed coding format and outputs the decoded multimedia data to the file manager 14. The file manager 14 stores the inputted multimedia data in the storage device 15 in units of files while registering management information for each multimedia data in the table 13 and managing it. The file manager 14 further retrieves multimedia data requested by the browser 16 from the storage device 15 and outputs it to the browser 16. The browser 16 is a user interface with the terminal device 1. The user operates the browser 16, inputs the data name (reference label) of multimedia data and requests reference to the multimedia data. The browser 16 creates a signal called a reference request in response to the user's input by the user. The reference request is a signal for requesting the multimedia data, which should be referred to by the user, of the file manager 14. The browser 16 receives the multimedia data searched by the file manager 14 and displays the same on a monitor (not shown) of the terminal device 1 as a text or a picture. When the multimedia data includes audio data, the browser 16 outputs the audio from a speaker (not shown).

The management information is described as follows. The management information is a set of a reference label, a storage time, a file name, a reference flag, an unreferred time and a retention coefficient. The reference label, the storage time, the file name, the reference flag, the unreferred time and the retention coefficient are respectively registered in the table 13 shown in FIG. 3(*a*) in predetermined areas. One column (one column in the vertical direction of the figure) of the table 13 is management information for multimedia data of one file.

For the reference label, the data name previously assigned to the corresponding multimedia data is employed.

The storage time is the time when the corresponding multimedia data has been stored in the storage device 15.

The file name is assigned by the file manager 14 to the multimedia data. The file name is unique among the multimedia data. In other words, the file manager 14 does not assign the same file name to a plurality of multimedia data. The role of the file name is absolutely different from that of the reference label and hence must be given attention.

The reference flag is information for distinguishing the current status of the corresponding multimedia data. The value $N_1$ of the reference flag, which is initially "0", takes any integer exceeding "0" in response to the reference status of the corresponding multimedia data. While the details are described later, each multimedia data is classified in the terminal device 1 roughly into any of requested-multimedia-data, related-multimedia-data and unrelated-multimedia-data. The requested-multimedia-data is that currently referred to by the user, and its value $N_1$ is set to "1". The related-multimedia-data is that determined by the file manager 14 as being related to the requested-multimedia-data, and its value $N_1$ is set at a number of neither "0" nor "1". The unrelated-multimedia-data is that not belonging to the requested-multimedia-data and the related-multimedia-data, and its value $N_1$ is set to "0".

The unreferred time is information indicating the time from when the user has completely referred to the multimedia data to the current time, i.e., the time when the corresponding multimedia data is not continuously referred to. The value $N_2$ of the unreferred time, which is initially "0", takes any integer from "0" to "1" in response to the reference status of the corresponding multimedia data. This value $N_2$, which is incremented by "1" every constant time (every minute in this embodiment) while the corresponding multimedia data is classified as unrelated-multimedia-data, is reset to "0" when the multimedia data starts to be referred to. Further, this value $N_2$ is kept "0" while the corresponding multimedia data is referred to. As to the related-multimedia-data, however, the value of its $N_2$ is not incremented even if not referred to.

The retention coefficient is information for the file manager 14 to determine whether or not to delete any multimedia data in the storage device 15. The value $N_3$ of the retention coefficient, which is initially "1", is incremented/decremented in accordance with the frequency of reference to the corresponding multimedia data. When the value $N_3$ reaches "0" or less in this embodiment, the corresponding multimedia data is deleted from the storage device 15.

The aforementioned values $N_1$, $N_2$ and $N_3$ are calculated by the file manager 14. Each calculation method is described later.

Detailed operations of the terminal device 1 of FIG. 1 are now described. The multiplexed signal transmitted by the data broadcasting station 2 is received by the tuner 11. The tuner 11 separates the multimedia data from the received multiplexed signal and outputs it to the decoder 12. The decoder 12 decodes the inputted multimedia data and outputs it to the file manager 14. When the multimedia data shown in FIG. 2 are inputted, this decoder 12 decodes Topic.html, Sub1.html, Sub2.html, . . . as shown in FIG. 4 and outputs it to the file manager 14.

Figure 5:
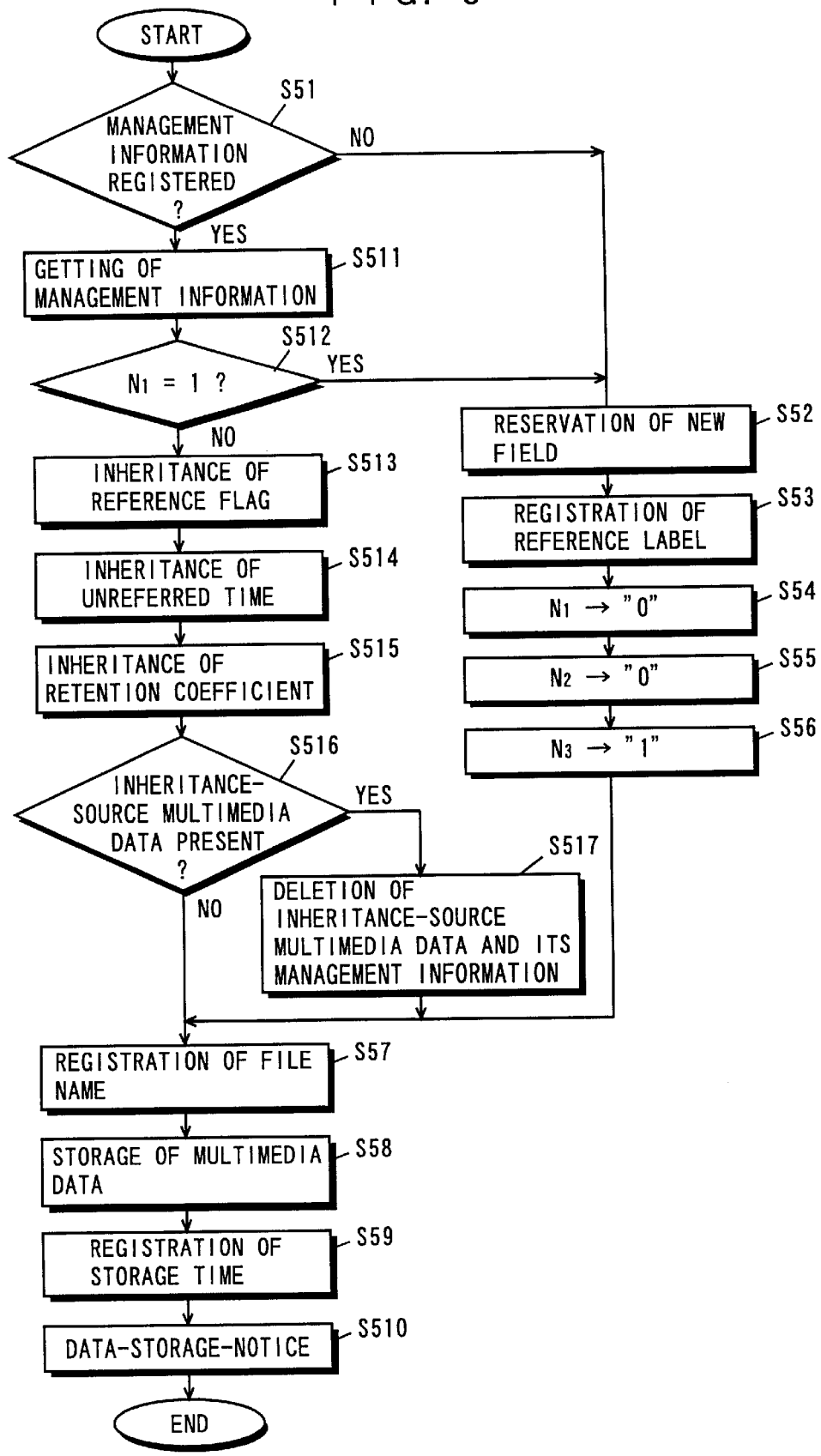
FIG. 5 is a flow chart of processing performed by the file manager 14 of FIG. 1 resulting from input of multimedia data for one file.

In response to the input of multimedia data for one file, the file manager 14 starts the procedure shown in a flow chart of FIG. 5. First, the file manager 14 checks whether or not the management information for the inputted multimedia data has already been registered in the table 13 (step S51). The step S51 is described in more detail. First, the data name is detected from the inputted multimedia data. Then, it is determined whether or not any of reference labels already registered in the table 13 coincides with the detected data name. If the identical reference label is registered in the table 13, the management information for the inputted multimedia data is already registered and hence the file manager 14 goes to a step S511. The steps S511 to S515 are described later for the sake of convenience. If no such reference label is present, on the other hand, the management information for the inputted multimedia data is unregistered. In other words, it follows that completely new multimedia data has been inputted this time, and hence a step S52 is carried out.

In order to register the management information for the new multimedia data inputted this time, the file manager 14 adds a column to the table 13 and reserves a new field 131, as shown in FIG. 3(*b*) (step S52). In the new field 131, the data name of the inputted multimedia data is registered as the reference label (step S53), "0" is registered as the initial value $N_1$ of the reference flag and the initial value $N_2$ of the unreferred time respectively (steps S54 and S55), and "1" is registered as the initial value $N_3$ of the retention coefficient (step S56). Then, the file manager 14 assigns a unique file name to the inputted multimedia data and registers the same in the new field 131 (step S57). Further, the file manager 14 stores the inputted multimedia data in the storage device 15 (step S58). The file manager 14 registers the storage time for the inputted multimedia data in the new field 131 (step S59). The final manager 14 creates a signal of data-storage-notice and outputs it to the browser 16 (step S510). This data-storage-notice specifies the newly stored multimedia data according to the reference label. The browser 16 analyzes the inputted data-storage-notice and notifies to the user the reference label of the multimedia data newly stored this time.

As a specific example, such a case that Topic.html of FIG. 4 has been completely and newly inputted into the file manager 14 is described. It is assumed that a file name 0001.htm has been assigned to Topic.html and Topic.html has been stored at 8:58 a.m. According to this assumption, registered in the novel area 131 are Topic.html as the reference label, 08:58 as the storage time, 0001.htm as the file name, "0" as the initial value $N_1$ of the reference flag, "0" as the initial value $N_2$ of the unreferred time, and further "1" as the initial value $N_3$ of the retention coefficient, as shown in FIG. 3(*c*). The file manager 14 registers the aforementioned management information in the table 13, and manages each multimedia data in the storage device 15 in units of files. In the following description, multimedia data may be referred to simply by its file name. For example, the multimedia data having the file name 0001.htm is simply referred to as 0001.htm.

The file manager 14 carries out the steps S51 to S510 every time completely new multimedia data is inputted. Thus, management information for the multimedia data is created by one set and newly registered in the table 13. It is assumed that the current time is 9:06 a.m. It is also assumed that, at the point of 9:06 a.m., Topic.html, Sub1.html and Sub2.html are completely newly inputted into the file manager 14 among the multimedia data (see FIG. 2) distributed in the time zone TB1. Namely, Sub0.html and the multimedia data distributed thereafter are not yet inputted into the file manager 14. According to this assumption, management information shown in FIG. 3(d) is registered at 9:06 a.m. in the table 13. The value $N_2$ of the unreferred time of each management information is immediately after the corresponding multimedia data has been stored in the storage device 15, i.e., initially "0". However, assuming that each multimedia data is not absolutely referred to by the user, each value $N_2$ is incremented by "1" every other minute from each storage time. Therefore, the value $N_2$ of Topic.html stored at 8:58 a.m. is "8" at 9:06 a.m. The remaining values $N_2$ are also calculated in a similar manner.

The user operates the browser 16 and inputs a reference label. Thus, multimedia data corresponding to this reference label is requested. The user can understand the data name (the reference label) in real time through the data-storage-notice at the step S510. Further, the user can understand the data name through WWW or a magazine. If understanding the data name through WWW or the magazine, the user is not sure whether the multimedia data having the name is stored in the storage device 15. In other words, the user inputs the reference label regardless of presence/absence of the multimedia data. Further, although the reference label has once been notified to the user, the corresponding multimedia data may be deleted by the file manager 14 from the storage device 15.

Figure 6:
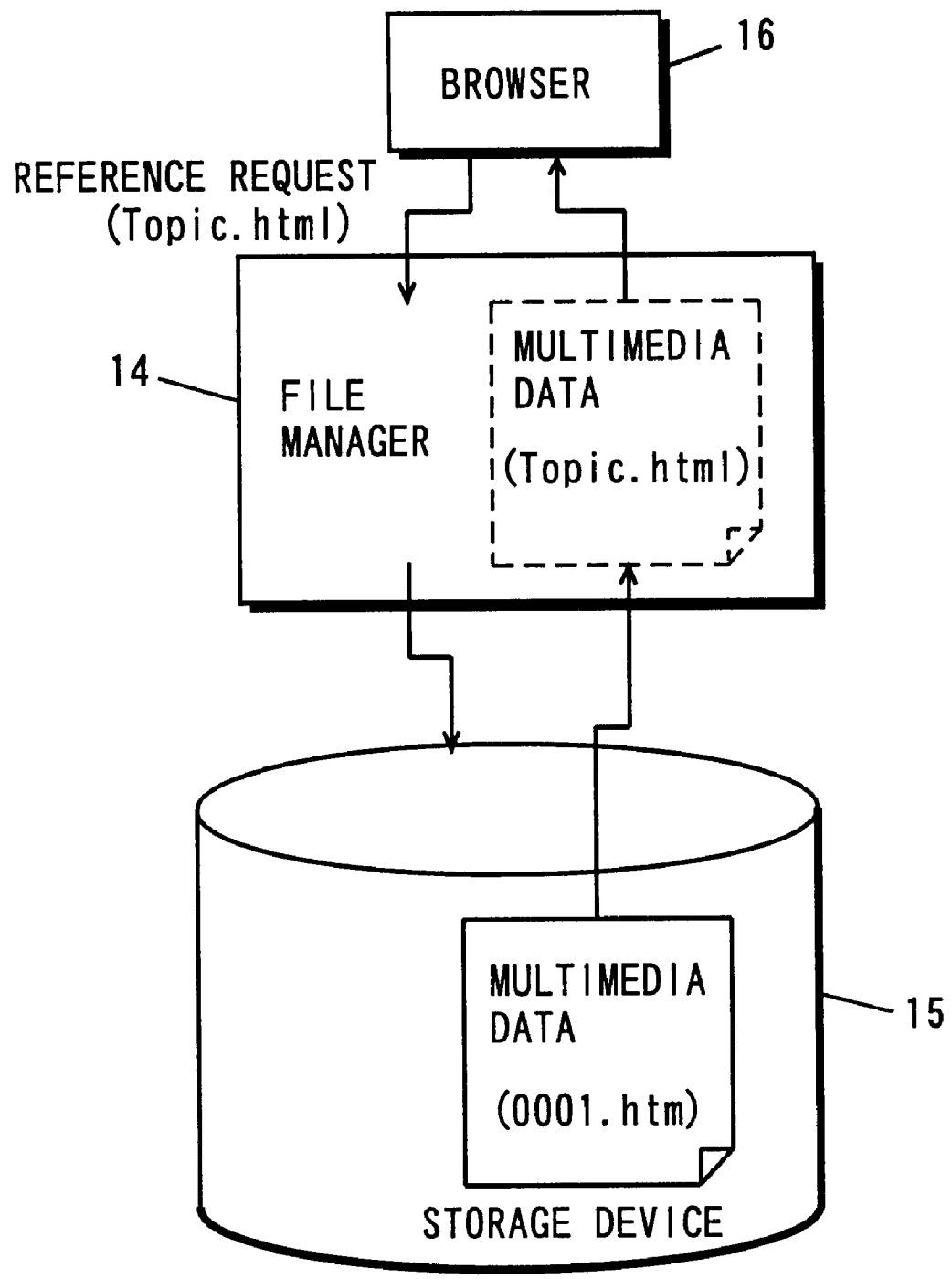
FIG. 6 is a diagram for illustrating the outline of processing by a browser 16 and the file manager 14 of FIG. 1.

The browser 16 creates a reference request including the reference label inputted by the user as shown in FIG. 6, and outputs it to the file manager 14. It is assumed here that this reference request includes Topic.html as the reference label and has been outputted immediately after 9:06 a.m. i.e., eight minutes after the storage time (8:58 a.m.).

Figure 7:
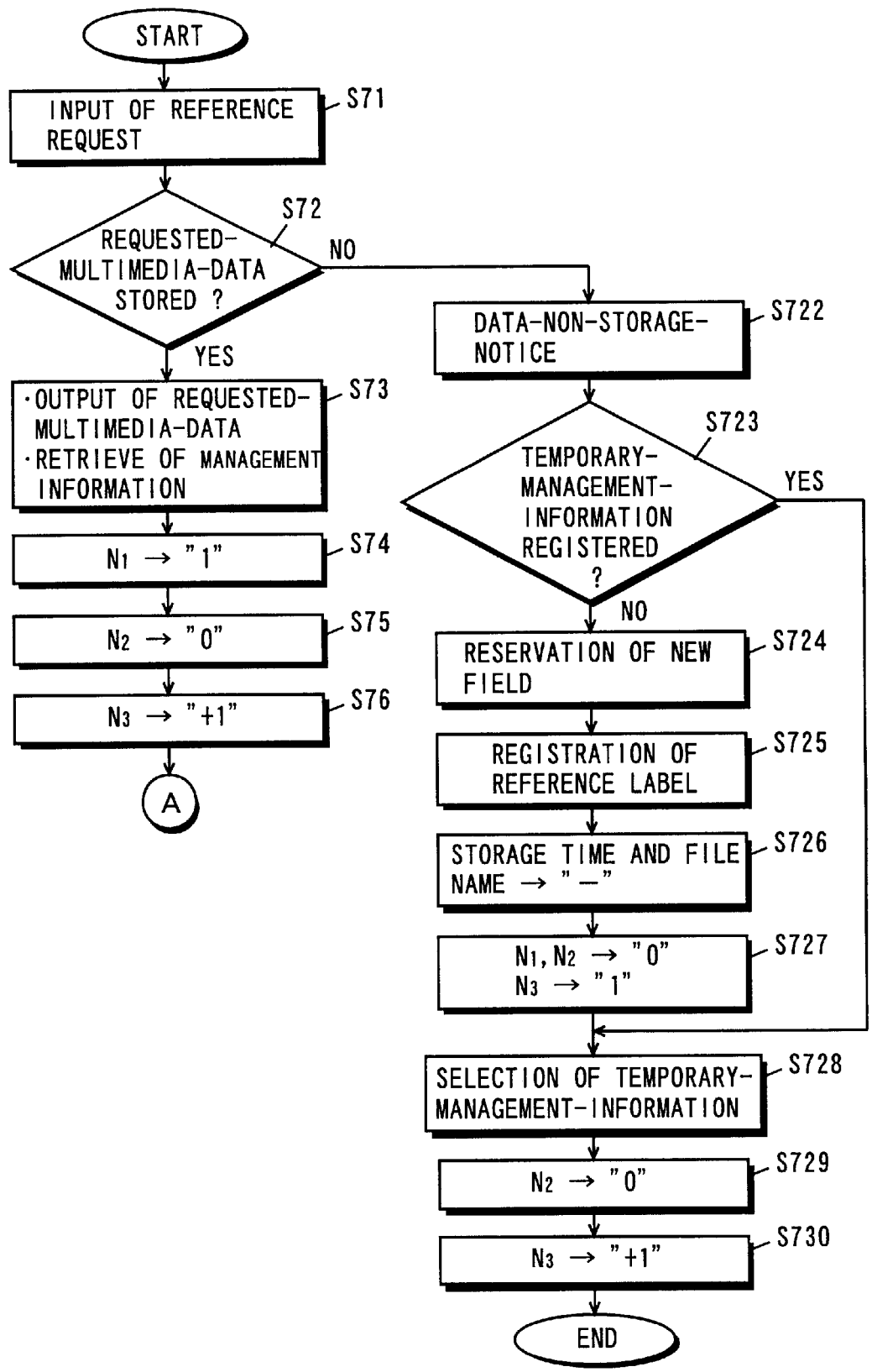
FIG. 7 is a flow chart of processing performed by the file manager 14 of FIG. 1 resulting from input of a reference request.

In response to the input of the reference request, the file manager 14 performs processing shown in a flow chart of FIG. 7. When the reference request is inputted (step S71), the file manager 14 searches for the reference label coinciding with the reference label included in the reference request from the table 13 and determines whether or not requested-multimedia-data is stored (step S72). The term requested-multimedia-data stands for the multimedia data requested by the user. If the reference label coinciding with the reference label in the reference request is not registered in the table 13, the file manager 14 determines that the requested-multimedia-data (Topic.html) is not stored in the storage device 15 and goes to S722 described later. If finding the reference label in the table 13, on the other hand, the file manager 14 determines that the requested-multimedia-data is stored in the storage device 15 and goes to a step S73.

Currently Topic.html has already been stored in the storage device 15 and is not deleted. Therefore, the file manager 14 retrieves Topic.html as the requested-multimedia-data from the storage device 15 and outputs it to the browser 16 (step S73). The browser 16 lets inputted Topic.html displayed on the monitor (not shown), so that the user can refer to the requested-multimedia-data (Topic.html). At a step S73, further, the file manager 14 retrieves the management information for the outputted requested-multimedia-data from the table 13. In the retrieved management information, the reference flag, the unreferred time and the retention coefficient are updated. Since the requested-multimedia-data is currently being referred to, the value $N_1$ of its reference flag is updated to "1" (step S74), and the value $N_2$ of its unreferred time is reset to "0" (step S75). Further, the value $N_3$ of its retention-coefficient is incremented by "1" (step S76). As the result of the steps S74 to S76, the values $N_1$, $N_2$ and $N_3$ of Topic.html are updated to "1", "0" and "2" immediately after 9:06 a.m. (refer to FIG. 10(a)).

Each multimedia data of FIG. 2 may be linked with another multimedia data through a hyperlink. The hyperlink is implemented by a prescribed HTML tag. This HTML tag is embedded in the link-source multimedia data, and specifies the data name of the link destination. It is assumed that hyperlinks shown in FIG. 8(a) are established for each multimedia data. From the link source Topic.html to the link destinations Sub0.html and Sub1.html, hyperlinks 81 and 82 are strung. In this case, HTML tags specifying the link destinations Sub0.html and Sub1.html are embedded in the link source Topic.html respectively. Through this hyperlink 81 or 82, the user operating the browser 16 can refer from a specific place of Topic.html to Sub0.html or Sub1.html.

Further, an HTML tag specifying the link destination Sub2.html is embedded in the link source Sub1.html, whereby a hyperlink 83 from Sub1.html to Sub2.html is strung. In addition, there are some hyperlinks between Sub2.html and xxx.html. For the sake of convenience, description and illustration of the hyperlinks intervening therebetween are omitted.

The linked multimedia data is related to each other. Sub0.html and Sub1.html, which are directly linked with Topic.html through the hyperlinks 81 and 82, are closely related to Topic.html. Further, Sub2.html, which is linked with Topic.html through the two hyperlinks 82 and 83, is related to Topic.html. However, the relation of Sub2.html is weak as compared with the relevance of Sub0.html and Sub1.html. xxx.html, which is linked with Topic.html through N hyperlinks, is weak in relation to Topic.html. Thus, the relation between two multimedia data weakens in proportion to the number of hyperlinks intervening therebetween.

In order to define with reference to the requested-multimedia-data the strength/weakness in the relation of the remaining multimedia data, the file manager 14 employs a unit called a link level. The link level is the number of hyperlinks intervening between the requested-multimedia-data and each multimedia data. In FIG. 8(a), for example, Sub0.html is directly linked with Topic.html. Therefore, the value L of the link level of Sub0.html is "1" as viewed from Topic.html. Similarly, the value L of Sub1.html is also "1". Since two hyperlinks intervene between Topic.html and Sub2.html, the value L of Sub2.html is "2" as viewed from Topic.html. Assuming that N hyperlinks intervene between Topic.html and xxx.html, the value L of xxx.html is "N". Thus, as the value L of the link level increases, the relevance between the requested-multimedia-data and the remaining multimedia data weakens.

The user takes an interest in multimedia data closely related to the requested-multimedia-data (i.e., having a small value L). Hereinafter the term related-multimedia-data stands for such multimedia data in which the value L of the link level is not more than a prescribed number M as viewed from the requested-multimedia-data. It is assumed here that M=2.

Figure 9:
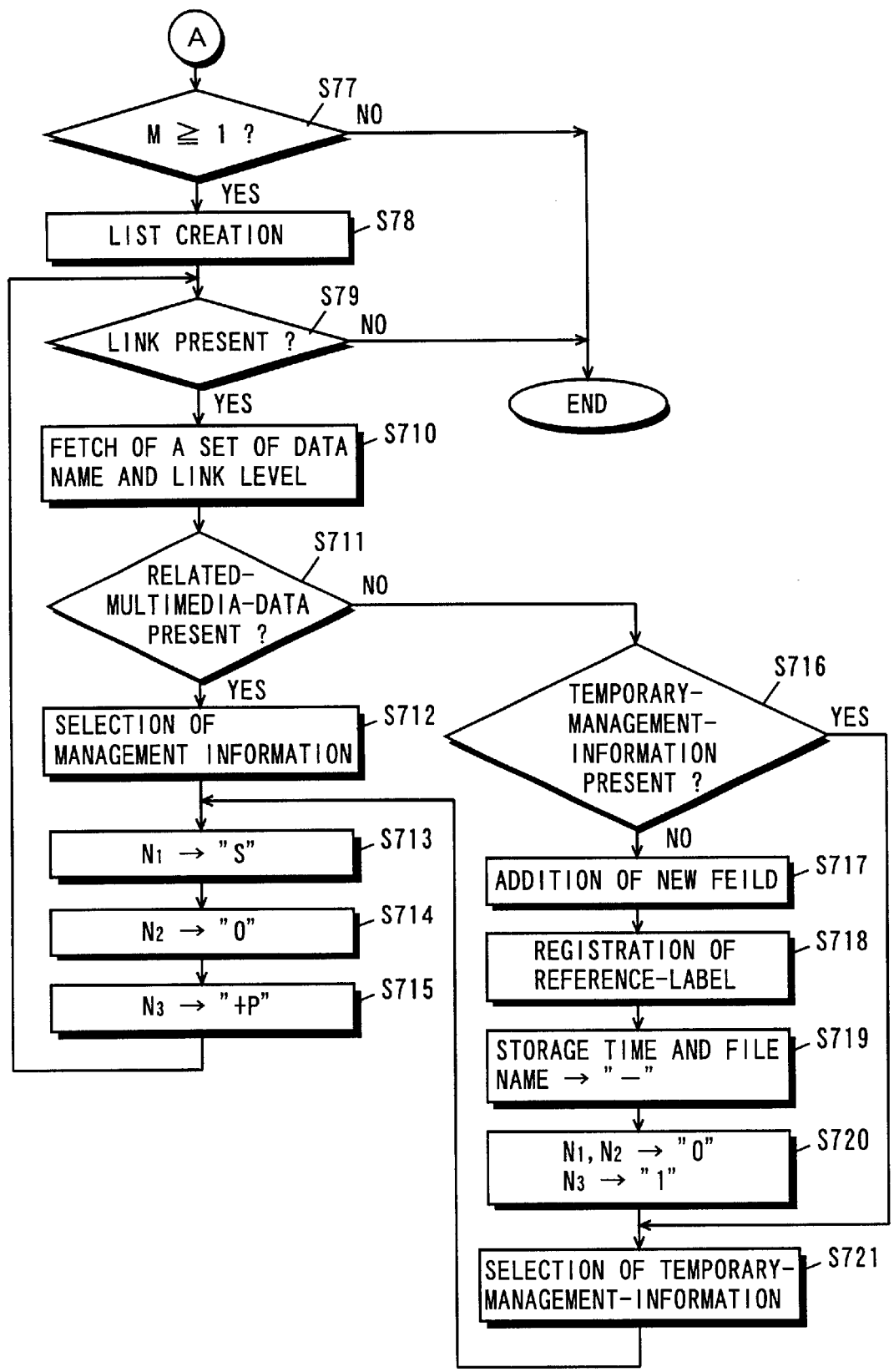
FIG. 9 is a flow chart showing processing subsequent to the flow chart of FIG. 7.

Sub0.html, Sub1.html and Sub2.html, the values L of the link levels of which are "1" or "2", are related-multimedia-data. On the other hand, assuming that $N \geq 3$, the value L of the link level for xxx.html is larger than M. Accordingly, xxx.html is not related-multimedia-data but unrelated-multimedia-data. One object of the terminal device 1 is to leave only multimedia data interesting to the user in the storage device 15. Therefore, the related-multimedia-data is, as compared with the unrelated-multimedia-data, preferably rendered hard to delete- from the storage device 15. Thus, the file manager 14 updates not only the management information for the requested-multimedia-data but also the management information for the related-multimedia-data. To this end, the file manager 14 decides which multimedia data is the related-multimedia-data. After termination of the step S76 in FIG. 7, therefore, processing following a step S77 of FIG. 9 is performed.

The file manager 14 checks a search range specified by the browser 16, and determines whether or not this search range is in excess of "1" (step S77). The search range, which is a threshold for the file manager 14 to distinguish the related-multimedia-data and the unrelated-multimedia-data from each other, corresponds to the aforementioned prescribed number "M". Namely, the file manager 14 decides such multimedia data that the relation between the value L of the link level and the search range M satisfies the condition L≦M as the related-multimedia-data. This M may be an integer exceeding "0".

Figure 11:
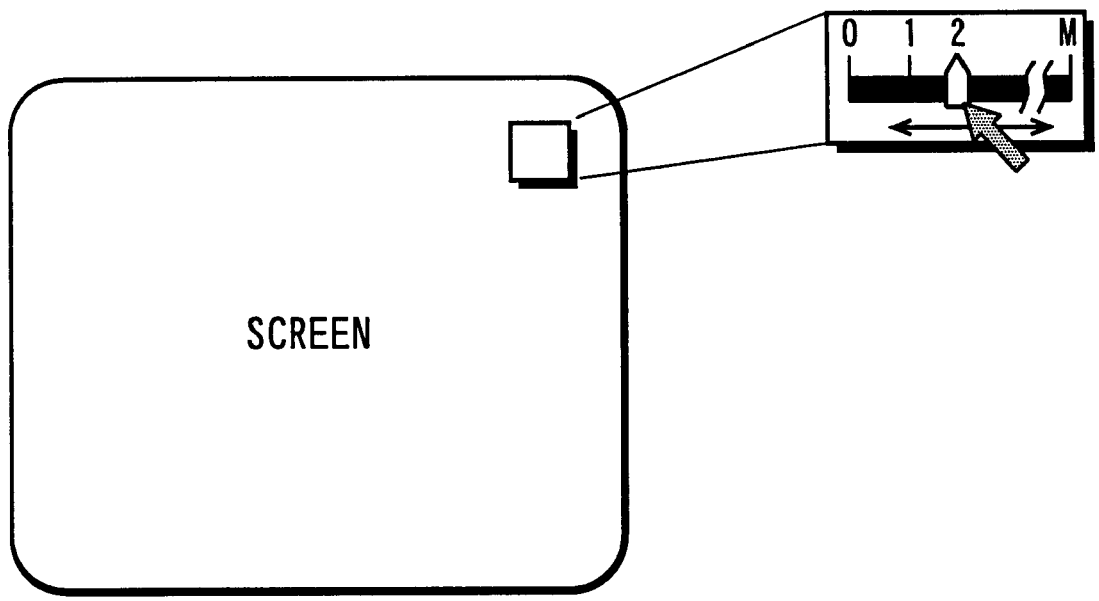
FIG. 11 is a diagram showing a screen formed by the browser 16 for prompting the user to set the value M of a search range.

The browser 16 displays a screen such as that shown in FIG. 11 as required, to prompt the user to set the value M of the search range. The user operates the browser 16 and inputs the value M of the search range. The browser 16 notifies the file manager 14 of the value M of the search range inputted by the user. The file manager 14 latches the notified value M of the search range in a prescribed storage area.

If the latched value M of the search range indicates "0", it follows that the browser 16 indicates that no related-multimedia-data may be searched for to the file manager 14. In this case, the file manager 14 terminates the processing of FIG. 9. If the value M of the search range indicates a level exceeding "1", the browser 16 indicates that related-multimedia-data must be searched for. In this case, the file manager 14 creates a list 84 of the hyperlinks (step S78). This list 84, on which the names of the multimedia data linked with the requested-multimedia-data through hyperlinks and the values L of the link levels are listed, is conceptually depicted as shown in FIG. 8(b).

So that the hyperlinks are established as described above, HTML tags specifying the data names of the link destinations must be embedded in the link-source multimedia data. Therefore, the file manager 14 repeats processing of first analyzing the source of the requested-multimedia-data for searching for the HTML tags and further analyzing the source of each link-destination multimedia data for searching for the HTML tag. Thus, the file manager 14 collects information (the data names and the values L) necessary for creation of the list 84. As shown in FIG. 8(b), listed on the list 84 every such multimedia data that the value "L" of the link level is below the value "M" of the search range are the data name(s) of the collected link destination(s) and the value(s) L of the link level(s) thereof. FIG.8(b) shows the case of M=2. When M=2, Sub0.html (L=1) Sub1.html (L=1) and Sub2.html (L=2) are described as the data names of the link destinations. While an HTML tag is embedded also in Sub0.html, Sub0.html is not currently stored in the storage device 15 as described later and hence the file manager 14 cannot analyze Sub0.html. Therefore, the link destination of Sub0.html is not selected as related-multimedia-data.

The file manager 14 decides the multimedia data listed on the list 84 as related-multimedia-data. Further, it decides that other than the requested-multimedia-data and the related-multimedia-data as unrelated-multimedia-data. Thus, the value M of the search range defines the range for the file manager 14 to search the related-multimedia-data. The file manager 14 can create no list when determining at the step S72 that the requested-multimedia-data is not stored in the storage device 15, and hence the processing following the step S77 is not carried out in this case.

If the data names of the link destinations and the link levels (L≧1) are listed on the list 84 (step S79), the file manager 14 fetches a set of the data name and the value "L" of the link level from the list 84 (step S710) for selecting related-multimedia-data to be processed. Then, the file manager 14 determines whether or not a reference label coinciding with the fetched data name has already been registered in the table 13, and further determines whether or not a storage time corresponding to the reference label has already been registered. Thus, whether or not the selected related-multimedia-data is stored in the storage device 15 is determined (step S711). If the related-multimedia-data is not stored in the storage device 15, a step S716 described later is carried out. If the related-multimedia-data is stored, on the other hand, a step S712 is carried out. It is assumed here that Sub1.html as the data name and the link level (L=1) are fetched from the list 84 in FIG. 8(b). Sub1.html as the reference label is registered in the table 13, and 08:59 is registered as the storage time corresponding to the reference level. In other words, Sub1.html is currently stored in the storage device 15. The reference flag, the unreferred time and the retention coefficient thereof are set immediately before 9:06 a.m. (i.e., immediately before the reference request is inputted) as "0", "7" and "11" (see FIG. 3(d)). Therefore, this time the file manager 14 goes from the step S711 to the step S712.

The file manager 14 selects the unreferred time, the reference flag and the retention coefficient corresponding to the fetched reference level as the management information to be processed (step S712). The value $N_1$ of the selected reference flag is set to "s" (step S713). The value of s is (L+1). L is the link level selected at the step S710. The value $N_2$ of the selected unreferred time is set to "0" (step S714). To the value $N_3$ of the selected retention coefficient, "p" is added (step S715). The value of p is $(\frac{1}{2})^L$.

According to the above assumption, the reference flag ($N_1$=0), the unreferred time ($N_2$=7) and the retention coefficient ($N_3$=1) of Sub1.html (L=1) are selected at the step S712 as the objects of processing. At the step S713, s=2 and hence the value $N_1$ is updated to "2". At the step S714, the value $N_2$ is updated to "0". At the step S715, further, p=½ and hence the value $N_3$ of the retention coefficient is updated to "1.5" with addition of "0.5" to the acquired value "1". Consequently, the management information for Sub1.html is immediately after 9:06 a.m. as shown in FIG. 10(a).

Description is made on such a case that the management information for Sub2.html (L=2) has been selected at the step S712 as the object of processing. The reference flag, the unreferred time and the retention coefficient of Sub2.html are immediately before 9:06 a.m. (i.e., immediately before the reference request is inputted) $N_1$=0, $N_2$=4 and $N_3$=1, as shown in FIG. 3(d). At the step S713, s=3 and hence the value $N_1$ is updated to "0". At the step S714, the value $N_2$ is updated to "0". At the step S715, p=p¼ and hence the value $N_3$ is updated to "1.25" with addition of "0.25" to the acquired value "1". Consequently, the management information for Sub2.html is immediately after 9:06 a.m. as shown in FIG. 10(a).

As described above, the management information for the related-multimedia-data listed on the list 84 (see FIG. 8(b)) is updated. On the list 84, however, the data name and the link level of multimedia data not yet registered in the storage device 15 may be listed. This is because the list 84 can be created if the link-source multimedia data is stored in the storage device 15. In other words, the list 84 can be created regardless of presence/absence of link-destination multimedia data. For example, although Sub0.html is not yet stored immediately before 9:06 a.m., the file manager 14 finds in the link-source Topic.html an HTML tag specifying Sub0.html as the link destination. At the same time, the file manager 14 can recognize the value L of the link level of Sub0.html as viewed from Topic.html. Therefore, the data name and the link level of related-multimedia-data not yet stored in the storage device 15 may be selected at the step S710.

In this case, the file manager 14 determines at the step S711 that the related-multimedia-data is not yet stored in the storage device 15. Hereinafter the term non-stored/related multimedia data stands for the related-multimedia-data determined at the step S711 as not yet stored in the storage device 15. Then, the file manager 14 determines whether or not a reference level coinciding with the data name of the non-stored/related multimedia data is already registered in the table 13, for determining presence/absence of temporary management information (step S716). If temporary-management- information is present, the file manager 14 directly goes to a step S721 (described later). If no temporary-management-information is present, the file manager 14 adds a new field to the table 13 by one column (step S717). In this new field, the data name of the related multimedia data is registered as the reference label (step S718), "–" indicating a blank is registered as the storage time and the file name (step S719), "0" is registered as the initial value $N_1$ of the reference flag and the initial value $N_2$ of the unreferred time respectively, and "1" is registered as the initial value $N_3$ of the retention coefficient (step S720). Thus, temporary-management-information is created. The storage time and the file name can not be set for multimedia data not stored in the storage device 15, and hence "–" is registered at this step S719. Then, the file manager 14 selects the created temporary-management-information as an object of processing from the table 13 (step S721), and performs the processing following the step S712.

Description is now made on such a case that no temporary-management-information for Sub0.html has been determined as registered at the step S716. First, at the step S718, Sub0.html is registered as the reference label in the new field. At the step S719, "–" is registered as the storage time and the file name. At the step S720, "0" is registered as the initial value $N_1$ of the reference flag and the initial value $N_2$ of the unreferred time respectively, and "1" is registered as the value $N_3$ of the retention coefficient. Thereafter, since s=2 if the value L of the link level of Sub0.html is "1" at the step S713, and hence the value $N_1$ is updated from "0" to "2". The value $N_2$ remains "0" even if the step S714 is carried out. At the step S715, p=0.5 if L is "1", and hence the value $N_3$ is updated to "1.5". Consequently, the temporary-management-information for Sub0.html is immediately after 9:06 a.m. as shown in FIG. 10($a$).

While the details are described later, when the value $N_3$ reaches "0" o or less in this embodiment, the corresponding multimedia data is deleted from the storage device 15. To the value $N_3$ of the retention coefficient of the requested-multimedia-data, however, only "1" is added at the step S76. To the values $N_3$ of not only the requested-multimedia-data but also the related-multimedia-data, "p" ($=(\frac{1}{2})^L$) is added at the step S715. Further, the value $N_3$ of each related-multimedia-data varies with the value of the link level (i.e., the degree of the relation to the requested-multimedia-data). Namely, the added value "p" increases as the link level decreases. Thus, related-multimedia-data closely related to the requested-multimedia-data remains in the storage device 15 for a long time due to updating to a larger retention coefficient.

As described above, the values $N_3$ of the requested-multimedia-data and the related-multimedia-data hardly reach "0" or less, and hence are hard to delete from the storage device 15. Thus, in/from the storage device 15, multimedia data highly interesting to the user tend to remain while less interesting multimedia data tend to be deleted. Thus, it follows that the capacity of the storage device 15 is effectively utilized.

The non-stored/relevant multimedia data for which temporary-management-information has been created is in the future inputted into the file manager 14 in general. It is assumed here that Sub0.html has been inputted immediately before 9:07 a.m. into the file manager 14. In response to the input of the multimedia data input, the file manager 14 determines presence/absence of the management information for the input of multimedia data (FIG. 5; step S51). Currently a reference label Sub0.html coinciding with the data name Sub0.html of the inputted multimedia data is registered in the table 13 (see FIG. 10($a$)). Therefore, the file manager 14 selects the management information for the inputted multimedia data as the object of processing from the table 13 (step S511). While currently the management information for Sub0.html is temporary, the file manager 14 handles at the step S511 the temporary-management-information and normal management information with no distinction.

The file manager 14 then determines whether or not the value $N_1$ of the reference flag is "1" (step S512). If this value $N_1$ is "1", it follows that multimedia data of the same data name as the inputted multimedia data is currently referred to by the user. According to this embodiment, multimedia data having the same data names are transmitted at time intervals as shown in FIG. 2, and hence the value $N_1$ may be "1" at the step S512. However, Topic.html is currently referred to, and Sub0.html, with its value $N_1$ being not "1" (see FIG. 10($a$)), is not being referred to. Therefore, processing following the step S513 is now described. Processing for the case where the value $N_1$ is "1" is described later.

The file manager 14 inherits the value $N_1$ of the reference flag, the value $N_2$ of the unreferred time and the value $N_3$ of the retention coefficient (steps S513, S514 and S515). More specifically, the respective values $N_1$, $N_2$ and $N_3$ of the object of processing are not updated but employed as such. Currently the respective values $N_1$, $N_2$ and $N_3$ of Sub0.html are "2", "0" and "1.5". Also after execution of these steps S513, S514 and S515, therefore, $N_1$, $N_2$ and $N_3$ remain "2", "0" and "1.5".

Then, the file manager 14 determines whether or not inheritance-source multimedia data for the multimedia data inputted this time is stored in the storage device 15 (step S516). At this step 516, the file manager 14 determines, if the reference label for the multimedia data inputted this time is redundant, i.e., doubly registered in the table 13, that the inheritance-source multimedia data is present and goes to a step S517. On the other hand, the file manager 14 goes, if no inheritance-source multimedia data is present in the storage device 15, to a step S57. As shown in FIG. 10($a$), the reference label Sub0.html is registered immediately before 9:07 a.m. in the table 13 only by one. Therefore, description of the step S517 is made later.

The file manager 14 assigns a file name to the inputted multimedia data (step S57). The inputted multimedia data is stored in the storage device 15 (step S58), and the file manager 14 registers the storage time of the inputted multimedia data (step S59). These file name and storage time are registered in a corresponding field in the table 13. Then, data-storage-notice is outputted to the browser 16 (step S510).

It is assumed here that inputted Sub0.html has been assigned at the step S57 a file name 0008.htm and thereafter stored at 9:06 a.m. in the storage device 15. According to this assumption, the table 13 holds immediately after 9:07 a.m. several sets of management information, as shown in FIG. 10(b). It is to be noted here that, immediately after 9:06 a.m., the file name and the storage time of Sub0.html have been undefined and in unregistrable states, and hence have been "–", i.e., blank (see FIG. 10(a)). Immediately after 9:07 a.m., however, the file name and the storage time of Sub0.html are registered and the management information therefor is completed. Here, the values $N_1$, $N_2$ and $N_3$ of Sub0.html are not newly registered at the point of the input of Sub0.html but inherited from the temporary-management-information. Namely, in this embodiment, non-stored/related multimedia data such as Sub0.html has the value $N_3$ of the retention coefficient exceeding "1" at the time point when stored in the storage device 15 (see FIG. 10(b)).

For the related-multimedia-data, as described above, temporary-management-information is created even if the multimedia data is not stored in the storage device 15 at the time point when requested by the browser 16. The reference flag, the unreferred time and the retention coefficient of such non-stored/related multimedia data are inherited from the temporary-management-information at the time point when the same are stored in the storage device 15. The value $N_3$ of this inherited retention coefficient has a value greater than the initial value "1". In other words, it follows that the non-stored/relevant multimedia data is supplied at the point of storage thereof with the relatively large value $N_3$ by the file manager 14. Thus, this value $N_3$ hardly reaches "01 or less, hence to be hard to delete from the storage device 15. Thus, in the storage device 15, multimedia data highly interesting to the user further tend to remain. Thus, it follows that the capacity of the storage device 15 is effectively utilized.

In comparison of FIGS. 10(a) and 10(b), it is to be noted that the values $N_2$ of the unreferred times of the requested-multimedia-data and the related-multimedia-data are not incremented after a lapse of one minute. Namely, the value $N_2$ is not incremented unless the value $N_1$ of the reference flag is "0" (the details are described later), and hence the value $N_3$ of the retention coefficient is hardly decremented and hard to delete from the storage device (for the details refer to FIG. 12 as described later).

It is assumed here that xxx.html has been inputted immediately before 9:08 a.m. into the file manager 14. xxx.html is also completely new multimedia data. Further, this xxx.html, not listed on the list (see FIG. 8(b)), is currently unrelated-multimedia-data. In response to the input of xxx.html, the file manager 14 performs the steps S51 to S510 shown in the flow chart of FIG. 5. Processing related to this completely new xxx.html is similar to that in the aforementioned input of Topic.html (immediately before 8:58 a.m.). Therefore, description of the steps S51 to S510 carried out for xxx.html is omitted. As a result of the processing of these steps S51 to S510, management information for xxx.html is newly added to the table 13, as shown in FIG. 10(c). The storage time thereof is 09:08. Its file name is 0009.htm. The initial value $N_1$ of its reference flag, the initial value $N_2$ of the unreferred time and the initial value $N_3$ of the retention coefficient are "0", "0" and "1".

Figure 12:
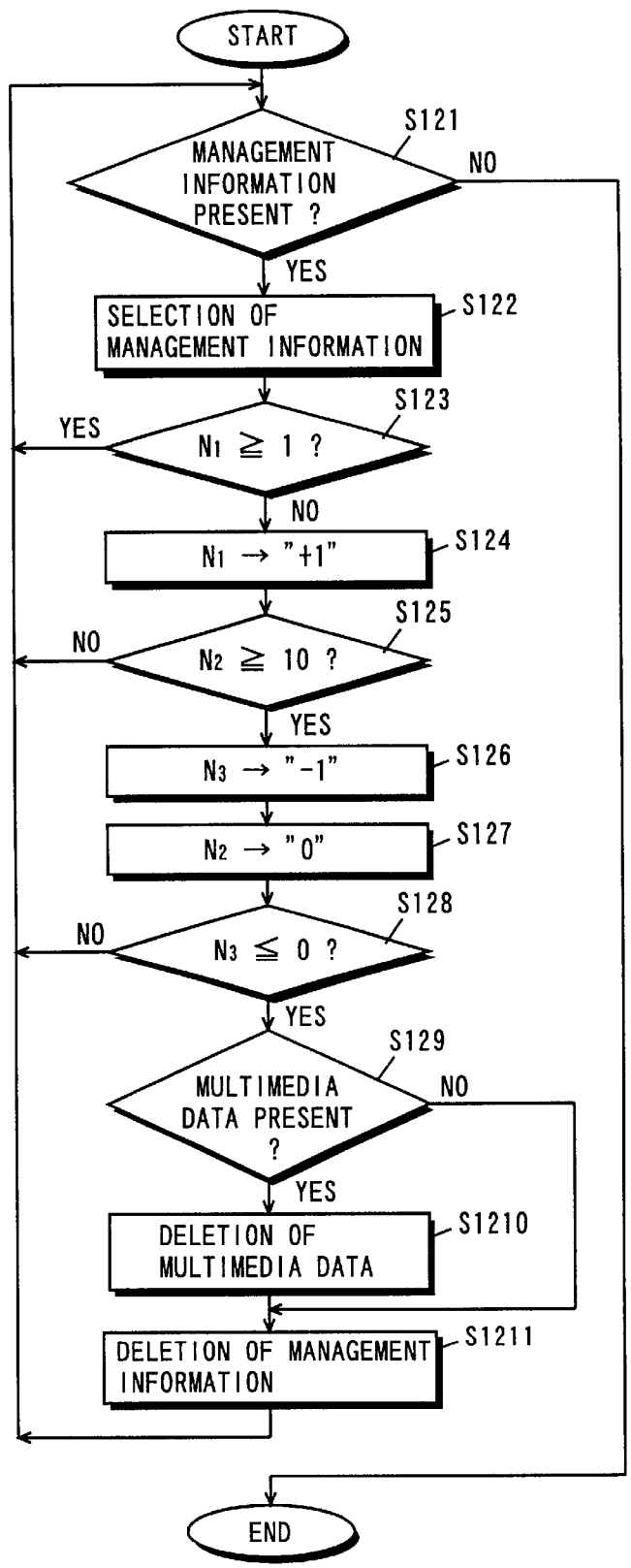
FIG. 12 is a flow chart of processing performed by the file manager 14 of FIG. 1 every minute.

Since the processing of FIG. 5 is an interrupt procedure in response to the input of multimedia data, the file manager 14 starts processing shown in a flow chart of FIG. 12 for each management information currently registered in the table 13 every minute. This procedure of FIG. 12, which has also been performed in 10 minutes from 8:58 a.m. up to immediately before 9:08 a.m., is for the sake of convenience described after the procedure of FIG. 7 and FIG. 9. It is assumed that the following description is on procedure performed immediately after 9:08 a.m.

First, the file manager 14 retrieves the table 13, and if management information to be processed is present (step S121), it selects the management information from the table 13 for one file (step S122). It is assumed here that the management information for Topic.html has been selected as the object of processing. The file manager 14 determines whether or not the value $N_1$ of the reference flag for the object of processing is in excess of "1" (step S123), and if this reference flag is in excess of "1", it returns to the step S121. As shown in FIGS. 10(a) to 10(c), the value $N_1$ of Topic.html is "1" from immediately after 9:06 a.m. up to the current time (immediately after 9:08 a.m.). Therefore, the file manager 14 returns to the step S121 if the object to be processed is the management information for Topic.html, and selects another management information. Namely, the management information for Topic.html is not at all updated but kept in the current status. Also as to Sub1.html and Sub2.html and Sub0.html, each value $N_1$ is currently (immediately after 9:08 a.m.) in excess of "1", whereby, if the management information for these related multimedia data is selected as the object of processing, it is processed similarly to the case of the management information for Topic.html and not at all updated.

If the management information for xxx.html is selected as the object of processing, however, the value $N_1$ of xxx.html currently (immediately after 9:08 a.m.) indicates "0". If the value $N_1$ is not in excess of "1", the file manager 14 increments the value $N_2$ of the corresponding unreferred time by "1" (step S124). As a result, the value $N_2$ of the unreferred time of xxx.html is updated to "1". Then, the file manager 14 determines whether or not the value $N_2$ of the unreferred time being the management information to be processed is "10" (step S125). If the value $N_2$ is not "10", the file manager 14 returns to the step S121. If the value $N_2$ is "10", on the other hand, a step S126 described later is carried out. Currently $N_2$ of xxx.html is not "10", and hence the file manager 14 returns to the step S121. The file manager 14 currently (immediately after 9:08 a.m.) selects all management information as the object to be processed, and since management information to be processed has disappeared, it temporarily terminates the processing of FIG. 12.

It is assumed here that the user of the browser 16 terminates the reference to Topic.html at 9:09 a.m. In response to this termination, the browser 16 generates reference-termination-notice which is information indicating the termination of the reference, and outputs it to the file manager 14. In this reference-termination-notice, the data name (this time Topic.html) of the requested-multimedia-data is included. When the user terminates the reference to the requested-multimedia-data, the management information for the requested-multimedia-data and the related-multimedia data is updated. Then, in response to the input of the reference-termination-notice, the file manager 14 performs processing shown in a flow chart of FIG. 13. First, the file manager 14 determines whether or not multimedia data (hereinafter referred to as inheritance-designation multimedia data) to inherit the management information for the requested-multimedia-data to which the reference has been terminated is stored in the storage device 15 (step S131). While this term inheritance-destination multimedia data stands for multimedia data having the same reference label as the requested-multimedia-data, to which the reference has been terminated, with the value $N_1$ of the reference flag being "0l, details are described later. The file manager 14 goes to a step S137 described later if the inheritance-destination multimedia data has already been stored, while going to a step S132 if it has not yet been stored. It is assumed here that the inheritance-destination multimedia data for Topic.html is not stored in the storage device 15, and the description is continued. According to this assumption, the file manager 14 selects the management information registered as to the requested-multimedia-data as the object of processing from the table 13 (step S132). The file manager 14 changes the value $N_1$ of the reference flag of the selected management information to "0" (step S133). Topic.html is classified as unrelated-multimedia-data.

Figure 8:
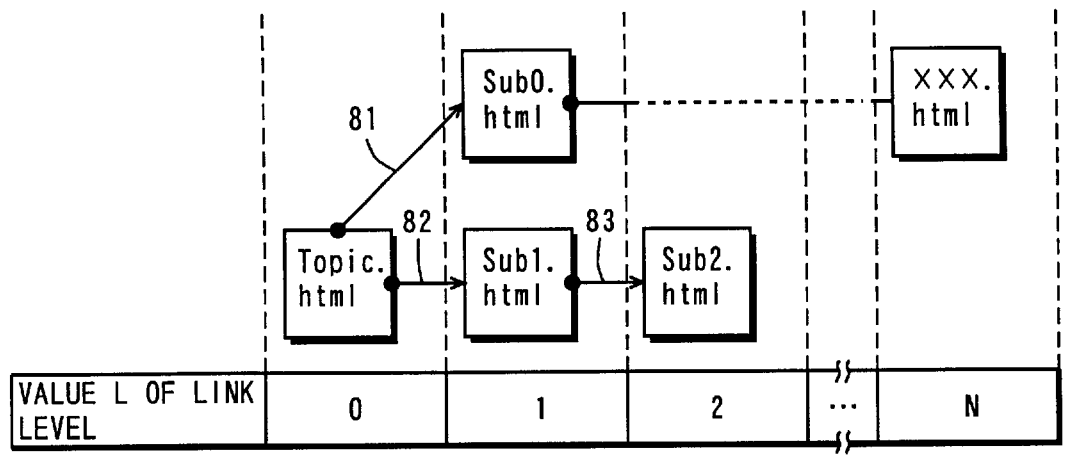
FIGS. 8(a) and 8(b) show diagrams for illustrating hyperlinks and link level of each multimedia data transmitted by the data broadcasting station 2.
Figure 8:
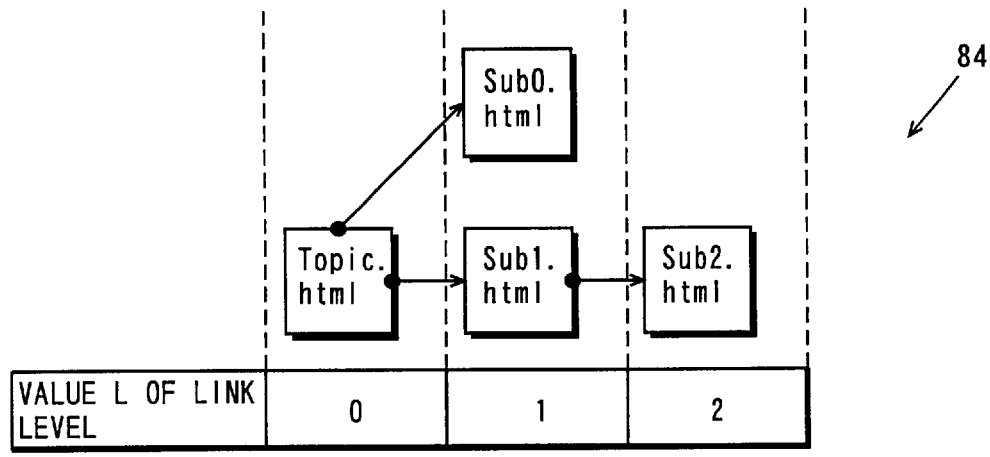

Then, the file manager 14 refers to the list 84 (see FIG. 8(*b*)) and determines whether or not related-multimedia-data is stored (step S134). The file manager 14 terminates the processing of FIG. 13 if no related multimedia data is present, while going to a step S135 if it is stored. Referring to FIG. 8(*b*), Sub0.html, Sub1.html and Sub2.html are stored as the related-multimedia-data for Topic.html. Therefore, the file manager 14 selects one data name of the related-multimedia-data listed on the list 84, and selects the management information for the multimedia data as the object of processing from the table 13 (step S135). The file manager 14 changes the value $N_1$ of the reference flag of the selected management information to "0" (step S136). The file manager 14 performs these steps S134 to S136 till selecting all data names listed on the list 84, and terminates the processing of FIG. 13. As a result, $N_1$ of Sub0.html, Sub1.html and Sub2.html are changed to "0" respectively. Thus, Sub0.html, Sub1.html and Sub2.html are also classified as unrelated-multimedia-data.

As a result of execution of the aforementioned steps S131 to S136, it follows that the table 13 holds management information as shown in FIG. 14(*a*). Thus, when the user terminates the reference to the requested-multimedia-data, the file manager 14 changes the values $N_1$ of the requested-multimedia-data and the related multimedia data to "0" respectively, and registers these as unrelated-multimedia-data in the table 13.

Figure 13:
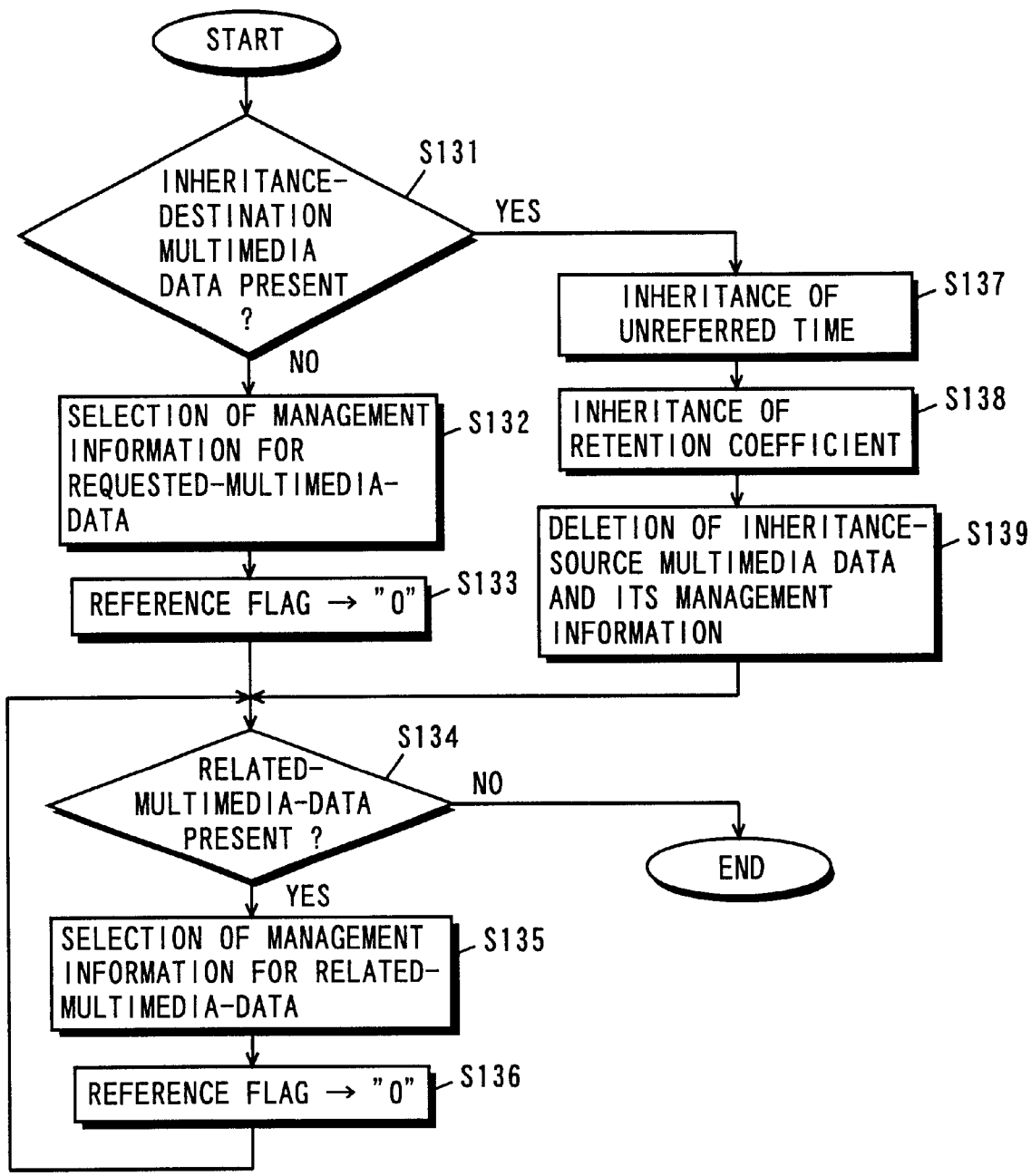
FIG. 13 is a flow chart of processing performed by the file manager 14 of FIG. 1 resulting from input of reference-termination-notice.

Since the procedure of FIG. 13 is interrupted in response to the input of the reference termination notice, the file manager 14 performs the procedure of FIG. 12 immediately after termination of this processing (i.e., immediately after 9:09 a.m.). The table 13 currently (immediately after 9:10 a.m.) holds the management information as shown in FIG. 14(*a*). The value $N_1$ of each management information is currently not in excess of "1". Therefore, the file manager 14 repeats the loop of the steps S121 to S124 five times, and selects management information including a reference label varying with each loop as the object of processing. Consequently, the value $N_2$ of each unreferred time is incremented by "1". Thus, $N_2$ of Topic.html, Sub0.html, Sub1.html and Sub2.html are changed to "1" respectively. Further, $N_2$ of xxx.html is changed to "2".

It is assumed that the user of the browser 16 does not at all refer to multimedia data for nine minutes from immediately after 9:09 a.m. up to immediately after 9:18. During the nine minutes, the value $N_1$ of each reference flag of the table 13 is not in excess of "1". In the first eight minutes, therefore, the loop of the steps S121 to S125 is repeated eight times every other minute, and management information varying with each loop is selected as the object of processing. Consequently, the value $N_2$ of each unreferred time immediately after 9:17 a.m. is incremented by "7" with respect to that immediately after 9:09 a.m. In other words, $N_2$ of Topic.html, Sub0.html, Sub1.html and Sub2.html are changed to "8" respectively. $N_2$ of xxx.html is changed to "9" (see FIG. 14(*b*)).

Further, if immediately after 9:18 a.m. the management information for Topic.html, Sub0.html, Sub1.html or Sub2.html is selected as the object of processing (steps S121 and S122), the value $N_1$ of each reference flag is not in excess of "1" (step S123), and hence $N_2$ of each unreferred time is incremented by "1" (step S124). Consequently, the values $N_2$ of Topic.html, Sub0.html, Sub1.html and Sub2.html reach "9" respectively.

Also when immediately after 9:18 a.m. the management information for xxx.html is selected and fetched (steps S121 and S122), the value $N_1$ of xxx.html is not in excess of "1" (step S123) and hence the value $N_2$ of xxx.html is incremented by "1" (step S124). Consequently, the value $N_2$ of xxx.html reaches "10". When selecting xxx.html as the object of processing, therefore, the file manager 14 determines at a step S125 that the value $N_2$ is "10" and goes to a step S126.

The file manager 14 decrements the value $N_3$ of the retention coefficient of the management information selected at the step S122 by "1" (step S126). Consequently, the value $N_3$ of xxx.html reaches "0". Then, the file manager 14 resets the value $N_2$ of the unreferred time to "0" (step S127). Then, the file manager 14 determines whether or not the decremented value $N_3$ is no more than "0" (step S128). The file manager 14 returns to the step S121 if this value $N_3$ is more than "0", while going to a step S129 if this value $N_3$ is not more than "0". This time the value $N_3$ of xxx.html is "0" and hence the file manager 14 goes to the step S129, for determining whether or not multimedia data corresponding to the selected management information is actually stored in the storage device 15 with reference to the table 13 (step S129). The terminal device 1 creates temporary-management-information for non-stored multimedia data not yet distributed. While such temporary-management-information has been created, non-distributed multimedia data may be present. Hence the step S129 is necessary. When determining at the step S129 that the multimedia data is present, the file manager 14 deletes the multimedia data specified by the management information from the storage device 15 (step S1210) and deletes from the table 13 the management information to be processed (step S1211). When determining that no multimedia data is present, the file manager 14 deletes from the table 13 only the management information to be processed (step S1211). This time xxx.html and its management information are deleted. Consequently, the table 13 holds immediately after 9:18 a.m. management information as shown in FIG. 14(*c*).

As described above, the value $N_3$ of the retention coefficient of Topic.html is incremented due to the reference by the user and hence hardly reaches "0". Therefore, Topic.html is hard to delete from the storage device 15. On the other hand, xxx.html has not been referred to by the user, and hence the retention coefficient $N_3$ is decremented and immediately reaches "0" or less. Thus, xxx.html is easy to delete from the storage device 15. Therefore, it follows that the terminal device 1 performs processing so as to leave multimedia data having had a high frequency of reference by the user in the storage device 15. In other words, multimedia data highly interesting to the user is stored in the storage device 15 for a long time while uninteresting multimedia data is immediately deleted from the storage device 15. Thus, even if comprising the storage device 15 of a small capacity, the terminal device 1 can effectively utilize a small storage area.

Although not directly referred to by the user, further, Sub0.html, Sub1.html and Sub2.html have constant relation to the multimedia data (Topic.html) referred to by the user, and are determined by the file manager 14 as highly interesting to the user. Therefore, the values $N_3$ of the retention coefficients of Sub0.html, Sub1.html and Sub2.html hardly reach "0" or less respectively, and these multimedia data are also hard to delete from the storage device 15. In other words, it follows that the terminal device 1 performs processing so as to leave not only the multimedia data (requested-multimedia-data) referred to by the user but also the related-multimedia-data therefor in the storage device 15. Thus, it follows that, in the storage device 15 of the terminal device 1, a large amount of multimedia data highly interesting to the user are stored. Thus, according to this terminal device 1, the multimedia data in the storage device 15 are automatically customized according to the taste of the user.

Now it is assumed that Topic.html, Sub1.html, Sub2.html, . . . distributed by the data broadcasting station 2 in the time zone TB2 arrive from the time immediately before 9:19 a.m. sequentially at the terminal device 1. First, Topic.html is inputted from the decoder 12 into the file manager 14. Topic.html in this time zone TB2 is identical with that of the same data name distributed in the time zone TB1. Further, currently the table 13 holds the management information for Topic.html (see FIG. 14(c)). Resulting from the current input of Topic.html, the file manager 14 performs the procedure of FIG. 5. First, the management information for Topic.html inputted this time is already registered in the table 13 (step S51), and hence selected as the object of processing (step S511). The value $N_1$ of its reference flag is "0" (step S512) and Topic.html is not being referred to, whereby the respective values $N_1$, $N_2$ and $N_3$ are inherited (steps S513 to S515). Then, it is determined that old Topic.html is stored in the storage device 15, i.e., it is determined that the inheritance-source multimedia data is stored (step S516). Thus, the file manager 14 goes to the step S517 for deleting the inheritance-source multimedia data from the storage device 15 while deleting the management information registered for the inheritance-source multimedia data (step S517). Further, a unique file name is assigned to new Topic.html and this file name is registered in the table 13 (step S57). It is assumed that this file name is 0002.htm. Further, newly inputted Topic.html is stored in the storage device 15 (step S58). In addition, the storage time thereof is registered in the table 13 (step S59). It is assumed that this storage time is 9:19 a.m. Then, data-storage-notice is made (step S510).

Figure 15:
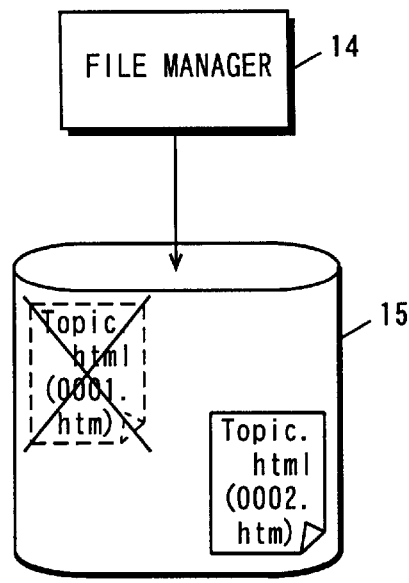
FIGS. 15(a) and 15(b) show diagrams for illustrating the outline of inheritance processing performed by the file manager 14 of FIG. 1.

Through the aforementioned steps S51, S511 to S517 and S57 to S510, old Topic.html (0001.htm) is deleted from the storage device 15 and new Topic.html (0002.htm) is newly stored in the storage device 15, as shown in FIG. 15(a). As the respective values $N_1$, $N_2$ and $N_3$ of new Topic.html (0002.htm), further, no predetermined initial values are set but the respective values $N_1$, $N_2$ and $N_3$ of the old one (0001.htm) are employed as such, as shown in FIG. 15(b). Thus, between the multimedia data identical with each other, the management information is inherited from the old multimedia data to the new one. If the user is interested in the old multimedia data, therefore, the new multimedia data being identical therewith is hard to delete from the storage device 15. Further, old Topic.html is deleted from the storage device 15, while the management information for old Topic.html is deleted from the table 13. Thus, it follows that multimedia data highly interesting to the user and being new is stored in the storage device 15.

Similarly to the above, it is assumed that Topic.html etc. distributed in the time zone TB2 arrive from the time immediately before 9:19 a.m. sequentially at the terminal device 1. Newly arriving Topic.html is identical with already stored old Topic.html. Different from the above is the point that the table 13 currently holds management information for Topic.html shown in FIG. 16(a). In other words, old Topic.html is currently referred to by the user, and the value $N_1$ of its reference flag is "1". If new Topic.html is inputted, according to this assumption, the management information for old Topic.html is selected as the object of processing (FIG. 5; steps S51 and S511). The value $N_1$ of its reference flag is "1" (step S512), and old Topic.html is being referred to. Therefore, inheritance procedure of the management information, i.e., the steps S513 to S517 cannot be performed. This is because at the step S517 old Topic.html being referred to by the user is deleted.

If the value $N_1$ is "1" at the step S512, therefore, the file manager 14 carries out the steps S52 to S510, creates temporary-management-information for new Topic.html, stores new Topic.html in the storage device 15, and outputs data-storage-notice. Description of the steps S52 to S510, which has already been made, is omitted here. Thus, it follows that, in the table 13, the management information for new Topic.html and old Topic.html, i.e., management information having the same reference label is redundantly registered as shown in FIG. 16(b). This old Topic.html and its management information are deleted when the user terminates the reference to old Topic.html (requested-multimedia-data). Namely, when the reference to Topic.html terminates, as described above, the browser 16 outputs the reference-termination-notice therefor to the file manager 14. When the reference-termination-notice is inputted, the file manager 14 performs the processing shown in FIG. 13.

The file manager 14 first determines whether or not the inheritance-destination multimedia data is present (step S131). The file manager 14 first determines whether or not the same reference label is redundantly registered in the table 13. If the same reference label is redundantly registered, the file manager 14 compares the storage times corresponding to the reference label and selects the subsequently stored multimedia data as the inheritance destination. Referring to FIG. 16(b), for example, the management information for Topic.html is redundantly registered, and the respective storage times are registered as 08:58 and 09:19. Namely, Topic.html assigned the file name 0002.htm is selected as the inheritance destination. Further, Topic.html having the file name 0001.htm is selected as the inheritance source.

When determining that the inheritance destination is present at the step S131, the file manager 14 inherits the value $N_2$ of the unreferred time included in the management information for the inheritance source and the value $N_3$ of the retention coefficient to the management information for the inheritance destination. More specifically, the value $N_2$ of the inheritance destination and the value $N_3$ of the retention time of the inheritance source are fetched. The fetched values $N_2$ and $N_3$ are registered and updated as the unreferred time and the retention coefficient for the inheritance destination (steps S137 and S138). However, the value $N_1$ of the reference flag is kept at "0" since the inheritance-destination multimedia data is currently not referred to. Further, the file manager 14 deletes the inheritance-source multimedia data from the storage device 15, while deleting the management information for the inheritance source from the table 13 (step S139). Immediately before the step S137, for example, the values $N_1$, $N_2$ and $N_3$ of 0002.htm have been "0", "0" and "1", as shown in FIG. 16(b). Further, the values $N_2$ and $N_3$ of 0001.htm have been "0" and "2". Immediately after the step S139, the values $N_2$ and $N_3$ of 0002.htm are updated to "0" and "2" as shown in FIG. 16(c), and the management information for 0001.htm is deleted. 0001.htm (multimedia data) itself is also deleted from the storage device 15.

If related-multimedia-data is present, after the step S139, the file manager 14 performs procedure for updating the value $N_1$ of each reference flag to "0" (steps S134 to S136). Description of these steps S134 to S136, which has already been made, is omitted here.

As described above, even if the inheritance-source multimedia data has been currently referred to by the user at the point of the determination at the step S511 in FIG. 5, inheritance of the management information is smoothly performed through the steps S137 to S139 of FIG. 13 performed when the reference terminates. Further, the inheritance source, i.e., the old multimedia data and the management information therefor are deleted. Thus, if the user is interested in the old multimedia data similarly to the above, new multimedia data being identical therewith is hard to delete from the storage device 15. In the storage device 15, further, new multimedia data highly interesting to the user and being new is stored.

As described above, the browser 16 may request multimedia data not yet stored in the storage device 15 of the file manager 14. Hereinafter such multimedia data requested by the browser 16 but not yet stored in the storage device 15 is referred to as non-stored/requested-multimedia-data. The non-stored/requested multimedia data has a possibility of being in the future stored in the storage device 15. Further, it is true that the user has intended to refer to the non-stored/requested multimedia data. When stored in the storage device 15, therefore, the non-stored/requested multimedia data is preferably rendered hard to delete from the storage device 15. It is assumed here that the data name (i.e., the reference label) of such non-stored/requested multimedia data is xxx.html.

If it has been impossible to find a reference label coinciding with the data name included in the reference request from the table 13 at the step S72 of FIG. 7, the file manager 14 decides the currently requested multimedia data as the non-stored/requested multimedia data. Then, the file manager 14 notifies to the browser 16 that the multimedia data is not present along with the reference label (step S722). When receiving this notice, the browser 16 lets the monitor (not shown) display an indication that the multimedia data is not present and the reference label, and notifies the fact to the user.

The file manager 14 determines whether or not temporary-management-information for the non-stored/requested multimedia data is registered in the table 13 (step S723). If the temporary-management-information is registered, the file manager 14 directly goes to a step S728 (described later). If temporary-management-information is registered, the file manager 14 performs steps S724 to S727 and creates temporary-management-information. First, the file manager 14 adds a new field to the table 13 by one column (step S724). In this new field, the data name of the non-stored/requested multimedia data is registered as the reference label (step S725). As the storage time and the file name, "–" is registered (step S726). Namely, the non-stored/requested multimedia data is not yet stored in the storage device 15 and hence the storage time and the file name thereof are undefined. In order to indicate that they are undefined, "–" indicating a blank is registered for the storage time and the file name. Further, "0" is registered as the initial value $N_1$ of the reference flag and the initial value $N_2$ of the unreferred time. In addition, "1" is registered as the initial value $N_3$ of the retention coefficient (step S727). Then, the file manager 14 selects, in the management information for the non-stored/requested multimedia data, the unreferred time and the retention coefficient as objects of processing from the table 13 (step S728). The value $N_2$ of the selected unreferred time is set to "0" (step S729). To the value $N_3$ of the selected retention coefficient, "1" is added (step S730).

Thus, also as to the non-stored/requested multimedia data, temporary-management-information is created at the time point when the information is requested by the browser 16 through the steps S724 to S727. Thus, similarly to the time when the remaining multimedia data has arrived at the file manager 14, "0", "0" and "1" are registered as the initial value $N_1$ of the reference flag, the initial value $N_2$ of the unreferred time and the initial value $N_3$ of the retention coefficient. Further, the retention coefficient $N_3$ of this temporary-management-information is incremented by "1" at a step S730, in order to reflect the fact that this non-stored/requested multimedia data has been requested by the browser 16. When the non-stored/requested multimedia data actually arrives at the file manager 14, the file manager 14 performs the steps S513 to s515 of FIG. 5. Thus, the created temporary-management-information is inherited by normal management information, whereby the non-stored/requested multimedia data is also hard to delete from the storage device 15.

In this terminal device 1, the decoder 12 continuously decodes the multimedia data transmitted from the data broadcasting station 2 in the broadcasting form and outputs it to the file manager 14, while the browser 16 refers to the multimedia data on the basis of an instruction by the user through the file manager 14. In other words, it follows that the decoder 12 and the browser 16 operate independently of each other. Thus, it follows that the multimedia data transmitted in the broadcasting form are temporarily stored in the storage device 15. However, the multimedia data stored in the storage device 15 are deleted depending on the reference status by the browser 16. Thus, it follows that only multimedia data highly interesting to the user remains in the storage device 15. Consequently, it follows that the multimedia data in the storage device 15 is customized by the user.

In this terminal device 1, further, the user can understand that new multimedia data has been stored in the storage device 15 for the multimedia data being currently referred to through the data-storage-notice displayed on the browser 16 (FIG. 5; step S510). Therefore, the user can understand the arrival of this new multimedia data in real time. Even if the new multimedia data has been stored, it follows that the old multimedia data is not deleted from the storage device 15 (FIG. 5; steps S516 and S517) but locked if the user is referring to the old multimedia data. Thus, it is possible to prevent the multimedia data being referred to by the user from being switched to another multimedia data at random, while switching the multimedia data to be displayed at a timing desired by the user.

A terminal device 1 according to a second embodiment of the present invention is now described. This terminal device 1 is different from that according to the first embodiment only in the following point: The terminal device 1 according to the first embodiment has performed the procedure of FIG. 5 when new multimedia data has been inputted from the decoder 12. However, a file manager 14 according to the second embodiment performs the procedure shown in a flow chart of FIG. 17 when new multimedia data is inputted. This is the difference between the first embodiment and the second embodiment. There is no other difference between the first and second embodiments. This difference is now mainly described.

It is assumed here that in the terminal device 1, similarly to that described with reference -to the first embodiment, Topic.html broadcasted in a time zone TB1 is displayed as requested-multimedia-data by the browser 16. According to this assumption, Sub1.html, Sub2.html and Sub0.html are selected as related-multimedia-data by the file manager 14, as shown in FIG. 8(b). In a table 13, management information shown in FIG. 18(a) is registered. It is assumed that, in such a state that these multimedia data broadcasted in the time zone TB1 are selected as requested-multimedia-data or related-multimedia-data, Topic.html, Sub1.html, Sub2.html, Sub0.html and xxx.html . . . transmitted by a data broadcasting station 2 in a time zone TB2 sequentially arrive at the terminal device 1.

Figure 19:
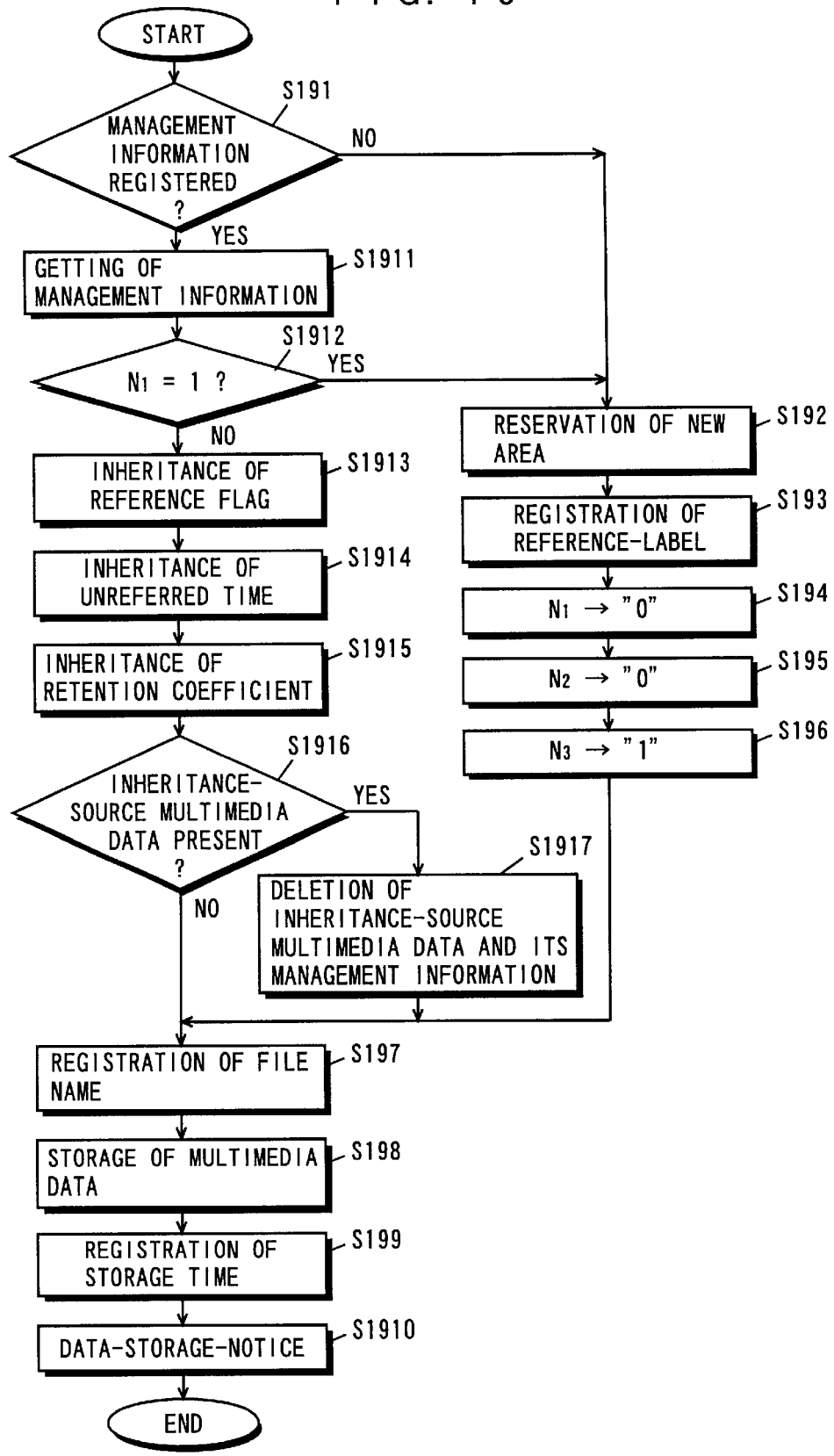
FIG. 19 is a flow chart showing detailed processing of a subroutine step S171 of FIG. 17.

Resulting from input of multimedia data for one file, the file manager 14 creates management information for this inputted multimedia data and stores it in a storage device 15 (step S171). This step S171 is a subroutine step, and a flow chart of its detailed procedure is shown in FIG. 19. This FIG. 19 includes steps S191 to S1917. The processing of these steps S191 to S1917 is identical to that of the steps S51 to S517 of FIG. 5. Therefore, description of the steps S191 to S1917 is omitted.

If new Topic.html (broadcasted in the time zone TB2) is inputted, the file manager 14 performs the steps S191, S1911, S1912 and S192 to S1910. Consequently, it creates temporary-management-information for new Topic.html and registers it in the table 13, while storing new Topic.html in the storage device 15. The temporary-management-information for new Topic.html includes Topic.html as a reference label, 09:19 as a storage time, 0002.htm as a file name, "0" as the value $N_1$ of a reference flag, "0" as the value $N_2$ of an unreferred time and "1" as the value $N_3$ of a retention coefficient (see FIG. 18(b)).

Figure 20:
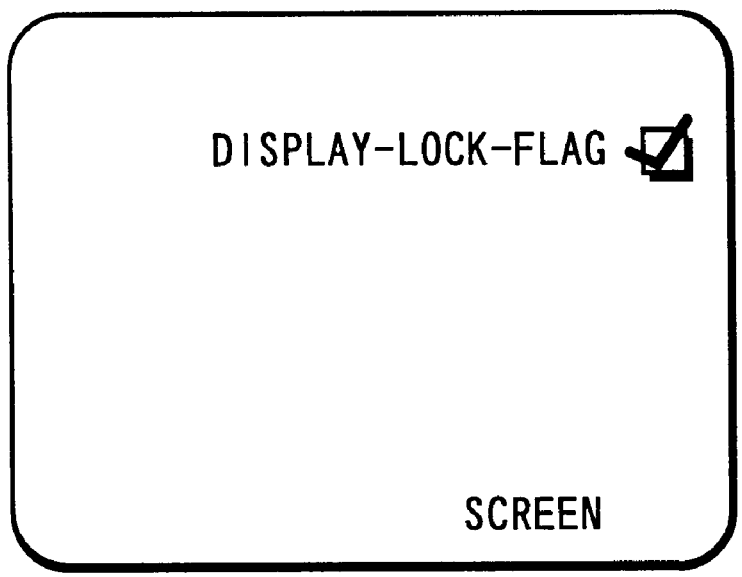
FIGS. 20(a) and 20(b) show diagrams illustrating screens formed by the browser 16 for prompting the user to set a display-lock-flag or a return flag.
Figure 20:
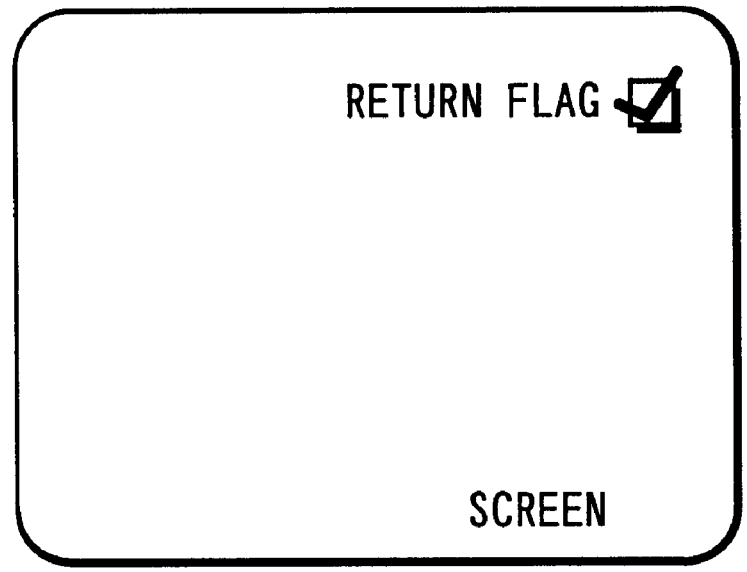

The browser 16 displays a screen such as that in FIG. 20(a) as required and prompts the user to set whether or not to set a display-lock-flag. The user operates the browser 16 and sets whether to turn the display-lock-flag ON or OFF. The browser 16 notifies to the file manager 14 whether the display-lock-flag set by the user is ON or OFF. The file manager 14 latches the notified display-lock-flag in a prescribed storage area. This display-lock-flag is information for indicating whether or not to let the newly inputted multimedia data forcibly displayed on the browser 16 based on a determination of the file manager 14. Namely, if the display-lock-flag is ON, the file manager 14 fetches no multimedia data from the storage device 15 unless a reference request from the browser 16 is inputted. Namely, this is similar to the first embodiment. If the display-lock-flag is OFF, however, the file manager 14 lets, if the multimedia data newly inputted this time satisfies a prescribed condition, the multimedia data satisfying the condition forcibly displayed on the browser 16 even if no reference request is received from the browser 16. This prescribed condition means a step S173.

The file manager 14 checks after the step S171 whether the latched display-lock-flag is ON or OFF (step S172). If the display-lock-flag is ON, the file manager 14 determines that the inputted multimedia data may not be forcibly displayed on the browser 16 and terminates the processing of FIG. 17. If the display-lock-flag is OFF, on the other hand, the file manager 14 determines that the browser 16 requests display of the inputted multimedia data in real time, and goes to the step S173.

At the step S173, the file manager 14 first determines whether or not a reference label coinciding with the reference label of the multimedia data inputted this time, i.e., the reference label of old multimedia data is registered in the table 13. If the coinciding reference label is present, further, the file manager 14 determines whether or not the value $N_1$ of the reference flag corresponding to the reference label of the old multimedia data is in excess of "1" (step S173). When satisfying this condition, the multimedia data inputted this time is identical to requested-multimedia-data or related-multimedia-data currently displayed by the browser 16, and is a new one.

When the condition at the step S173 is satisfied, the file manager 14 goes to a step S174. If this condition is not satisfied, on the other hand, the processing in FIG. 17 terminates. As described above, old Topic.html (file name 0001.htm) is currently referred to by the user, and hence the value $N_1$ of the reference flag of its management information is set to "1". Further, since inputted this time is new Topic.html (file name 0002.htm), it follows that the condition at the step S173 is satisfied. When the condition at the step S173 is satisfied, the multimedia data inputted this time is displayed by the browser 16 through processing at a later step S177. Similarly to the case of requested-multimedia-data, therefore, the multimedia data inputted this time must also be rendered hard to delete from the storage device 15.

Therefore, the file manager 14 selects the management information for the multimedia data inputted this time as the object of processing (step S174), and currently increments the value $N_3$ of the retention coefficient by "1" (step S175). Consequently, the retention coefficient $N_3$ of new Topic.html (file name 0002.htm) reaches "2" (see FIG. 18(c)). Then, the file manager 14 latches the file name of the multimedia data currently displayed by the browser 16 in a prescribed storage area (step S176).

Then, the file manager 14 fetches the multimedia data inputted this time from the storage device 15. Further, the file manager 14 generates a signal of data-display-instruction and outputs it along with the fetched multimedia data to the browser 16 (step S177). The data-display-instruction is a signal for letting simultaneously outputted multimedia data forcibly displayed on the browser 16. When the data-display-instruction is inputted, the browser 16 stops display of the currently displayed multimedia data and displays the newly inputted multimedia data. Consequently, this time the display of the browser 16 is switched from old multimedia data (the reference label is Topic.html and the file name is 0001.htm) to new multimedia data (the reference label is Topic.html and the file name is 0002.htm).

Figure 17:
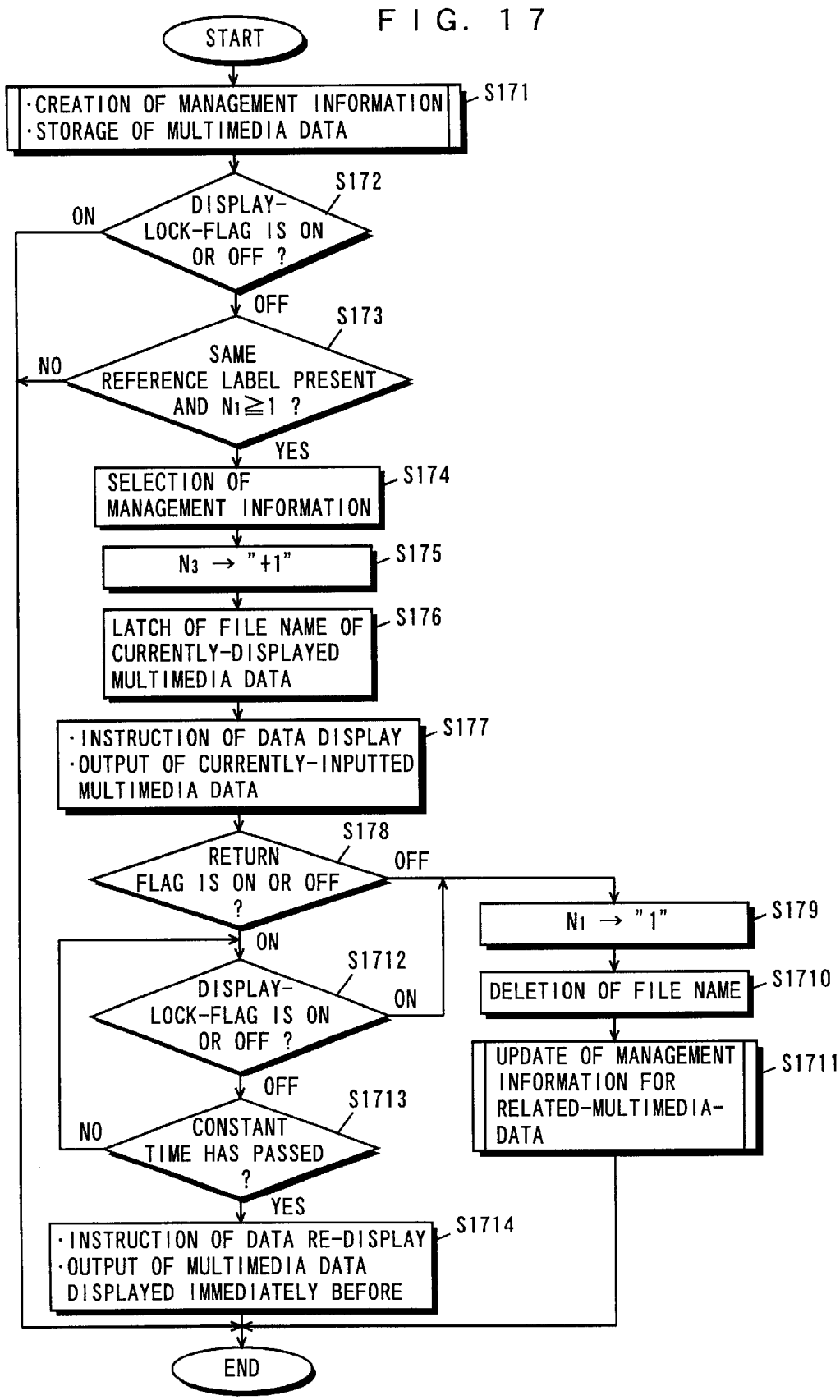
FIG. 17 is a flow chart of processing performed by the terminal device 1 according to the second embodiment of the present invention resulting from input of multimedia data for one file.

In the terminal device 1 according to the second embodiment, as described above, when new multimedia data identical to multimedia data (requested-multimedia-data) being displayed by the browser 16 or related-multimedia-data is inputted, the file manager 14 outputs the inputted new multimedia data to the browser 16 and lets it displayed. Thus, the browser 16 can get new multimedia data that is highly interesting to the user in real time from the file manager 14 for displaying it without outputting a reference request to the file manager 14. Thus, the terminal device 1 becomes more user-friendly. In the above description, the multimedia data (the reference label is Topic.html and the file name is 0001.htm) having been displayed and the newly inputted multimedia data (the reference label is Topic.html and the file name is 0002.htm) are identical with each other. However, also in such relation that the multimedia data (the reference label is Topic.html and the file name is 0001.htm) having been displayed and the newly inputted multimedia data (e. g., the reference label is Sub1.html) are identical with each other, the steps S171 to S177 of FIG. 17 are similarly carried out.

The browser 16 displays a screen such as that shown in FIG. 20(b) as required, and prompts the user to set whether or not to set a return flag. The user operates the browser 16 and sets whether to turn the return flag ON or OFF. The browser 16 notifies to the file manager 14 whether the return flag set by the user is ON or OFF. The file manager 14 latches the notified return flag in a prescribed storage area. This return flag is information indicating whether the browser 16 continuously displays the multimedia data inputted along with the data-display-instruction or re-displays the original multimedia data after a given time passes. In other words, the browser 16 sets the return flag ON, and requires the file manager 14 to re-display the original multimedia data after the given time passes. On the other hand, the browser 16 sets the return flag OFF, and requires continuous display of the multimedia data inputted with the data-display-instruction.

The file manager 14 checks after the step S171 whether the latched return flag is ON or OFF (step S178). If the return flag is OFF, the file manager 14 determines that the user requests continuous display of the multimedia data outputted at the step S177. In other words, the file manager 14 decides the multimedia data inputted this time as requested-multimedia-data. Then, the file manager 14 updates, as shown in FIG. 18(d), the value $N_1$ of the reference flag of the management information selected at the step S174 to "1" (step S179). Thus, the multimedia data inputted this time is decided as the requested-multimedia-data currently referred to by the user, and continuously displayed.

Figure 21:
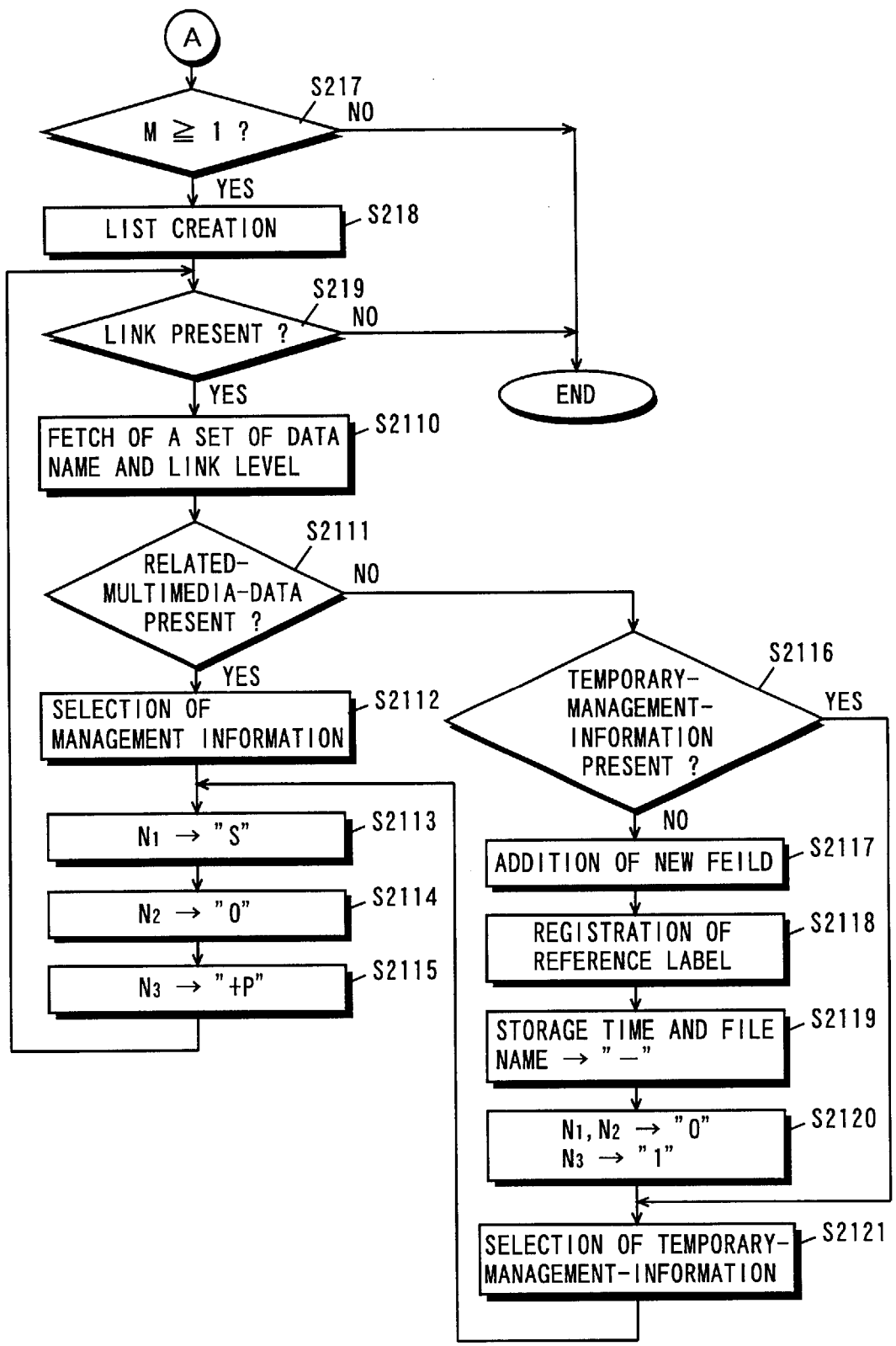
FIG. 21 is a flow chart showing detailed processing of a subroutine step S1710 of FIG. 17.

Thus, the file name latched at the step S176 is unnecessary and hence the file manager 14 deletes this file name (step S1710). Then, the file manager 14 updates management information for related-multimedia-data being related to the decided requested-multimedia-data (step S1711). This step S1711 is a subroutine step, and a flow chart of its detailed procedure is shown in FIG. 21. This FIG. 21 includes steps S211 to S2115. The processing of these steps S211 to S2115 is identical to that of the steps S77 to S721 of FIG. 9. Therefore, description of the steps S211 to S2115 is omitted. Thus, the related-multimedia-data is hard to delete from the storage device 15.

If the return flag is ON at the step S178, the file manager 14 determines that the user requires to re-display the original multimedia data after the given time passes. The file manager 14 then determines whether the display-lock-flag is ON or OFF (step S1712) and thereafter determines whether or not the given time has passed from the time when the multimedia data inputted this time is outputted at the step S177 (step S1713).

For example, the user is currently referring to the new multimedia data outputted at the step S177. When highly interested in this multimedia data, the user sets the display-lock-flag shown in FIG. 20(a) ON. When the display-lock-flag is set ON before the aforementioned given time passes, the file manager 14 goes to the aforementioned step S179. Also by this, the multimedia data inputted this time is decided as the requested-multimedia-data being currently referred to by the user.

As described above, the file manager 14 does not output multimedia data newly inputted in itself to the browser 16, on the basis of an instruction by the browser 16. Namely, if the display-lock-flag is continuously set OFF, the file manager 14 shifts from the steps S172 to S173, and hence it follows that newly arriving multimedia data are sequentially continuously displayed on the browser 16. In other words, the browser 16 switches its display every time multimedia data is inputted. If the display-lock-flag is ON at the point of the step S1711, however, it follows that the file manager 14 stops output of newly inputted multimedia data. This is because the display-lock-flag is determined as ON through the determination at the step S172. Thus, the browser 16 can require the file manager 14 as required to stop outputting the multimedia-data. Thus,the browser 16 can display, among multimedia data sequentially continuously inputted, specific multimedia data for a long time. Thus, the terminal device becomes more user-friendly.

When determining that the given time has passed at the step S1713, on the other hand, the file manager 14 regards that the user is not interested in the new multimedia data outputted at the step S177 and fetches multimedia data having the file name retained at the step S176 from the storage device 15. Further, the file manager 14 generates a signal of data-re-display-instruction and outputs it to the browser 16 along with the fetched multimedia data (step S1714). The data-re-display-instruction is a signal for letting simultaneously outputted multimedia data be forcibly displayed on the browser 16. When the data-re-display-instruction is inputted, the browser 16 stops display of the currently displayed multimedia data and displays re-inputted multimedia data. Consequently, this time the display of the browser 16 is switched from new multimedia data (the reference label is Topic.html and the file name is 0002.htm) to old multimedia data (the reference label is Topic.html and the file name is 0001.htm).

As described above, after the given time has passed since the inputted new multimedia data is displayed on the browser 16, the file manager 14 lets multimedia data displayed immediately before be re-displayed. Thus, the file manager 14 lets the new multimedia data be displayed on the browser 16 in real time while letting the multimedia data be displayed immediately before being re-displayed on the browser 16 after a lapse of the given time. This series of processing is automatically performed by the file manager 14, and hence requires no specific operation from the user. Thus, the terminal device becomes more user-friendly.

While the above embodiments are described taking multimedia data as an example, it is also possible to apply the present terminal device 1 to digital data (typically, video or audio data).

While the invention has been described in detail, the foregoing description is in all aspects illustrative and not restrictive. It is understood that numerous other modifications and variations can be devised without departing from the scope of the invention.

What is claimed is:

1. A terminal device performing prescribed processing on data distributed by a data broadcasting station distributing, at predetermined time intervals, a series of data that are identical with each other and updated with time, comprising:

a receiving part receiving the data transmitted by said data broadcasting station;

a management part creating and managing management information as to the data received by said receiving part;

a storage device storing the data for which the management information has been created by said management part, said management information including a retention coefficient for determining whether the data stored in said storage device is deleted or not; and a reference part outputting the data requested by a user, wherein said management part decrements the retention coefficient stored in said storage device at a prescribed timing while incrementing the retention coefficient of the data outputted by said reference part, deletes, when the managed retention coefficient is decremented to a prescribed value, the corresponding data from said storage device, deletes, when new data identical to old data in said storage device is inputted to the management part, the old data from said storage device, and uses the management information for the deleted old data as management information for the new data.

2. The terminal device in accordance with claim 1, wherein said management part further creates, when the data requested by said reference part is not stored in said storage, temporary-management-information as to the data in advance, and lets, at a time point when the data requested by said reference part is inputted in the management part, the corresponding temporary-management-information inherited as management information for the inputted data.

3. The terminal device in accordance with claim 2, wherein said management part further determines whether data related to the data requested by the user (hereinafter, related data) has been stored in said storage device; and when said related data has been stored, increments a retention coefficient of the related data.

4. The terminal device in accordance with claim 3, wherein said management part determines whether said related data is stored in said storage device in a search range specified by said user, and said search range is determined in relation to the number of links between the data requested by said user and said related data.

5. The terminal device in accordance with claim 3, wherein said management part increments the retention coefficient of said related-data on the basis of the degree of the relation to the data requested by said user.

6. The terminal device in accordance with claim 3, wherein said management part further creates temporary-management-information for the related-data when said related data is not stored in said storage device, and uses the temporary-management-information as the management information for the related-data when receiving the related data for which said temporary-management-information has been created.

7. The terminal device in accordance with claim 3, wherein when new data that are identical to data or related-data thereof being outputted by said reference part and are obtained by updating the data or the related data is inputted in said management part, said management part further outputs the inputted new data to said reference part.

8. The terminal device in accordance with claim 7, wherein after a given time passes since the inputted new data is outputted to said reference part, said management part further re-outputs, to the reference part, the data outputted immediately before the new data.

9. The terminal device in accordance with claim 7, wherein said management part further does not output, on the basis of setting by said user, the data newly inputted in said management part to the reference part.

10. The terminal device in accordance with claim 1, wherein data distributed by said data broadcasting station is coded in a predetermined coding format, said terminal device further comprises a decoding part for decoding the data received by said receiving part in accordance with said predetermined coding format and outputting the data to said management part, and said decoding part and said reference part operate independently of each other.

11. The terminal device in accordance with claim 1, wherein every time data has been stored in said storage device, said management part generates a signal indicating the data has been stored, and outputs the signal to said reference part.

12. The terminal device in accordance with claim 1, wherein said management part does not delete, while data stored in said storage device is outputted by said reference part, the data from said storage device.

13. A terminal device performing prescribed processing on data distributed by a data broadcasting station distributing, at predetermined time intervals, a series of data that are identical with each other and updated with time, comprising:

a receiving part receiving the data distributed by said data broadcasting station;

a management part creating and managing management information as to the data received by said receiving part;

a storage device storing the data for which the management information has been created by said management part, said management information including a retention coefficient for determining whether the data stored in said storage device is deleted or not; and a reference part outputting the data requested by a user, wherein said management part decrements the retention coefficient stored in said storage device at a prescribed timing while incrementing the retention coefficient of the data outputted by said reference part, deletes, when the managed retention coefficient is decremented to a prescribed value, the corresponding data from said storage device, and creates, when new data not identical to old data in said storage device is inputted, the old data from said storage device.

* * * * *